US012688253B2

(12) United States Patent　　　(10) Patent No.: US 12,688,253 B2
Hayashi　　　　　　　　　　　　　(45) Date of Patent: Jul. 21, 2026

(54) ARITHMETIC PROCESSING SYSTEM AND CONVOLUTION OPERATION METHOD

(71) Applicant: Panasonic Intellectual Property Management Co., Ltd., Osaka (JP)

(72) Inventor: Yoshiteru Hayashi, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 1169 days.

(21) Appl. No.: 17/691,590

(22) Filed: Mar. 10, 2022

(65) Prior Publication Data

US 2022/0197972 A1　　Jun. 23, 2022

Related U.S. Application Data

(63) Continuation of application No. PCT/JP2021/000902, filed on Jan. 13, 2021.

(30) Foreign Application Priority Data

Mar. 31, 2020　(JP) ................................. 2020-063205
Mar. 31, 2020　(JP) ................................. 2020-063206
Oct. 5, 2020　(JP) ................................. 2020-168368

(51) Int. Cl.
　　*G06F 17/15*　　　(2006.01)
　　*G06N 3/0464*　　(2023.01)
(52) U.S. Cl.
　　CPC ......... *G06F 17/153* (2013.01); *G06N 3/0464* (2023.01)
(58) Field of Classification Search
　　CPC .......... G06F 17/153; G06F 17/16; G06F 3/06; G06F 3/0601–0613; G06F 2213/28; G06F 13/28; G06N 3/0464
　　See application file for complete search history.

(56) References Cited

U.S. PATENT DOCUMENTS

| | | | |
|---|---|---|---|
| 12,147,914 B2 * | 11/2024 | Singh ...................... | G06N 3/082 |
| 2019/0095130 A1 * | 3/2019 | Xu .......................... | G06N 3/045 |

(Continued)

FOREIGN PATENT DOCUMENTS

| | | |
|---|---|---|
| JP | 2017-126203 | 7/2017 |
| WO | 2019/234794 | 12/2019 |

OTHER PUBLICATIONS

C. Kim et al., A Deep Learning Convolution Architecture for Simple Embedded Applications, 2018 IEEE 7th International Conference on Consumer Electronics—Berlin (ICCE—Berlin), 2018 (Year: 2018).*

(Continued)

*Primary Examiner* — Emily E Larocque
(74) *Attorney, Agent, or Firm* — Greenblum & Bernstein, P.L.C.

(57)　　　　　　ABSTRACT

An arithmetic processing system includes an external memory and an arithmetic-logic unit. The arithmetic-logic unit performs at least operations of 1) acquiring a first partition map from each input feature map stored in the external memory, the first partition map being one of partition maps included in the input feature map; executing a convolution operation on the first partition maps acquired from the external memory; storing, in the external memory, first partition maps that have undergone the convolution operation, and 2) acquiring a second partition map from each input feature map stored in the external memory, the second partition map being one of the partition maps; executing a convolution operation on the second partition maps acquired from the external memory; and storing, in the external memory, second partition maps that have undergone the convolution operation.

16 Claims, 18 Drawing Sheets

(56)                     References Cited

U.S. PATENT DOCUMENTS

| | | |
|---|---|---|
| 2019/0279095 A1 | 9/2019 | Guntoro et al. |
| 2021/0081489 A1 | 3/2021 | Yamakura |

OTHER PUBLICATIONS

Office Action from Japan Patent Office (JPO) in Japanese Patent Appl. No. 2020-168368, dated May 9, 2023, together with an English language translation.
International Search Report (ISR) from International Searching Authority (Japan Patent Office) in International Pat. Appl. No. PCT/JP2021/000902, dated Apr. 20, 2021, together with an English language translation.

\* cited by examiner

Number of partitions of each partition map used in convolution operations of currently processing layer Number of partitions of each partition map used in convolution operations of next layer Number of partitions of each partition map stored in external memory

Number of partitions in partition map used in convolution operation of currently processing layer Number of partitions in partition map used in convolution operation of next layer Number of partitions in partition map stored in external memory

ARITHMETIC PROCESSING SYSTEM AND CONVOLUTION OPERATION METHOD

CROSS REFERENCE TO RELATED APPLICATIONS

This is a continuation application of PCT International Application No. PCT/JP2021/000902 filed on Jan. 13, 2021, designating the United States of America, which is based on and claims priority of Japanese Patent Application No. 2020-063205 filed on Mar. 31, 2020, Japanese Patent Application No. 2020-063206 filed on Mar. 31, 2020, and Japanese Patent Application No. 2020-168368 filed on Oct. 5, 2020.

FIELD

The present disclosure relates to an arithmetic processing system for executing convolution operations in a neural network, and a convolution operation method.

BACKGROUND

Arithmetic processing systems for executing convolution operations in a neural network have conventionally been known. Patent Literature (PTL) 1 discloses an arithmetic processing system that includes an arithmetic-logic unit for executing operations and an external memory connected to the arithmetic-logic unit. In this arithmetic processing system, convolution operations are performed on data that has been read out from the external memory, and data that has undergone the operations is written to the external memory.

CITATION LIST

Patent Literature

PTL 1: Japanese Unexamined Patent Application Publication No. 2017-126203

SUMMARY

However, the arithmetic processing system in above-described PTL 1 can be improved upon.

In view of this, the present disclosure provides an arithmetic processing system or the like capable of improving upon the above related art.

An arithmetic processing system according to one aspect of the present disclosure is an arithmetic processing system that executes a convolution operation. The arithmetic processing system includes an external memory that stores a plurality of input feature maps that have not yet undergone the convolution operation and a plurality of filter factors that are used in the convolution operation, and an arithmetic-logic unit that executes a convolution operation using the plurality of input feature maps and the plurality of filter factors. The arithmetic-logic unit performs at least operations of 1) acquiring a plurality of first partition maps by acquiring a first partition map from each of the plurality of input feature maps stored in the external memory, the first partition map being one of a plurality of partition maps included in the input feature map; executing the convolution operation on the plurality of first partition maps acquired from the external memory; and storing, in the external memory, the plurality of first partition maps that have undergone the convolution operation, and 2) acquiring a plurality of second partition maps by acquiring a second partition map from each of the plurality of input feature maps stored in the external memory, the second partition map being one of the plurality of partition maps; executing the convolution operation on the plurality of second partition maps acquired from the external memory; and storing, in the external memory, the plurality of second partition maps that have undergone the convolution operation.

An arithmetic processing system according to another aspect of the present disclosure is an arithmetic processing system that executes a convolution operation. The arithmetic processing system includes an external memory that stores a plurality of input feature maps that have not yet undergone the convolution operation and a plurality of filter factors that are used in the convolution operation, and an arithmetic-logic unit that executes the convolution operation using the plurality of input feature maps and the plurality of filter factors. The arithmetic-logic unit performs operations of 1) acquiring a plurality of first partition maps by acquiring a first partition map from each of the plurality of input feature maps stored in the external memory, the first partition map being one of $n$ partition maps included in the input feature map, $n$ being an integer greater than or equal to 2; executing the convolution operation on the plurality of first partition maps acquired from the external memory; and storing, in the external memory, the plurality of first partition maps that have undergone the convolution operation, and 2) acquiring a plurality of k-th partition maps by acquiring a k-th partition map from each of the plurality of input feature maps stored in the external memory, the k-th partition map being one of the $n$ partition maps, $k$ being an integer greater than or equal to 2 and less than or equal $n$; executing the convolution operation on the plurality of k-th partition maps acquired from the external memory; and storing, in the external memory, the plurality of k-th partition maps that have undergone the convolution operation.

A convolution operation method according to one aspect of the present disclosure is a convolution operation method of executing a convolution operation on input data. The convolution operation method includes acquiring first partial data from each input data stored in an external memory, the first partial data being part of partial data included in each input data; executing the convolution operation on each first partial data acquired from the external memory; and storing, in the external memory, each first partial data that has undergone the convolution operation, and acquiring second partial data from each input data stored in the external memory, the second partial data being part of the partial data included in each input data; executing the convolution operation on each second partial data acquired from the external memory; and storing, in the external memory, each second partial data that has undergone the convolution operation.

An arithmetic processing system according to another aspect of the present disclosure is an arithmetic processing system that executes a convolution operation. The arithmetic processing system includes an external memory that stores a plurality of input feature maps that have undergone the convolution operation and a plurality of filter factors that are used in the convolution operation, and an arithmetic-logic unit that executes a convolution operation using the plurality of input feature maps and the plurality of filter factors. The arithmetic-logic unit performs at least operations of 1) acquiring compressed data of a plurality of first partition maps by acquiring compressed data of a first partition map from each of the plurality of input feature maps stored in the external memory, the first partition map being one of a plurality of partition maps included in the input feature map, 2) decompressing compressed data of the plurality of first partition maps acquired from the external memory, 3) executing the convolution operation on the plurality of first partition maps, and 4) compressing and storing data of the plurality of first partition maps that have undergone the convolution operation, in the external memory.

An arithmetic processing system according to another aspect of the present disclosure is an arithmetic processing system that executes a convolution operation. The arithmetic processing system includes an external memory that stores a plurality of input feature maps that have not yet undergone the convolution operation and a plurality of filter factors that are used in the convolution operation, and an arithmetic-logic unit that executes a convolution operation using the plurality of input feature maps and the plurality of filter factors. The arithmetic-logic unit performs at least operations of 1) acquiring compressed data of a plurality of first partition maps by acquiring compressed data of a first partition map from each of the plurality of input feature maps stored in the external memory, the first partition map being one of n partition maps included in the input feature map, where n being an integer greater than or equal to 2, 2) decompressing compressed data of the plurality of first partition maps acquired from the external memory, 3) executing the convolution operation on the plurality of first partition maps, 4) compressing and storing data of the plurality of first partition maps that have undergone the convolution operation, in the external memory, 5) acquiring compressed data of a plurality of k-the partition maps by acquiring compressed data of a k-th partition map from each of the plurality of input feature maps stored in the external memory, the k-th partition map being one of the n partition maps, where k being an integer greater than or equal to 2, 6) decompressing compressed data of the plurality of k-th partition maps acquired from the external memory, 7) executing the convolution operation on the plurality of k-th partition maps, and 8) compressing and storing data of the plurality of k-th partition maps that have undergone the convolution operation, in the external memory.

A convolution operation method according to another aspect of the present disclosure is a convolution operation method of executing a convolution operation on input data. The convolution operation method includes acquiring compressed data of first partial data from each input data stored in an external memory, the first partial data being part of partial data included in each input data, decompressing compressed data of each first partial data acquired from the external memory, executing the convolution operation on each first partial data, and compressing and storing each first partial data that has undergone the convolution operation, in the external memory.

An arithmetic processing system or the like according to one aspect of the present disclosure is capable of improving upon the above related art.

It is to be noted that some specific embodiments of the present disclosure may be implemented via a system, a method, an integrated circuit, a computer program, or a computer-readable recording medium such as a CD-ROM, or may be implemented via any combination of a system, a method, an integrated circuit, a computer program, and a recording medium.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 17 is a schematic diagram illustrating a layout of partition maps in the external memory of the arithmetic processing system according to Embodiment 4.

FIG. 18 is a schematic diagram illustrating a layout of partition maps in the external memory of an arithmetic processing system according to Embodiment 5.

DESCRIPTION OF EMBODIMENTS

Figure 1:
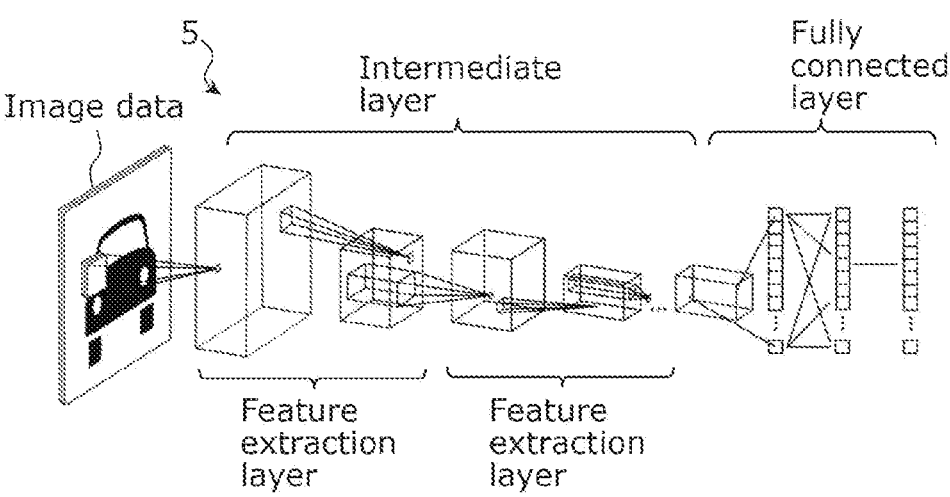
FIG. 1 is a schematic diagram illustrating a convolution neural network.

For example, if the internal memory of the arithmetic-logic unit has small capacity, it is necessary to read out data from the external memory for every execution of arithmetic processing because the internal memory cannot continue to store the data that is read out from the external memory. Therefore, there is a problem that the amount of data transfer between the arithmetic-logic unit and the external memory increases and the efficiency of data transfer will decline.

It is an object of the present disclosure to resolve the problem described above and to provide an arithmetic processing system or the like that reduces a decline in the efficiency of data transfer between the arithmetic-logic unit and the external memory.

An arithmetic processing system according to one embodiment of the present disclosure is an arithmetic processing system that executes a convolution operation. The arithmetic processing system includes an external memory that stores a plurality of input feature maps that have not yet undergone the convolution operation and a plurality of filter factors that are used in the convolution operation, and an arithmetic-logic unit that executes a convolution operation using the plurality of input feature maps and the plurality of filter factors.

The arithmetic-logic unit performs at least operations of 1) acquiring a plurality of first partition maps by acquiring a first partition map from each of the plurality of input feature maps stored in the external memory, the first partition map being one of a plurality of partition maps included in the input feature map; executing the convolution operation on the plurality of first partition maps acquired from the external memory; and storing, in the external memory, the plurality of first partition maps that have undergone the convolution operation, and 2) acquiring a plurality of second partition maps by acquiring a second partition map from each of the plurality of input feature maps stored in the external memory, the second partition map being one of the plurality of partition maps; executing the convolution operation on the plurality of second partition maps acquired from the external memory; and storing, in the external memory, the plurality of second partition maps that have undergone the convolution operation.

In this way, the arithmetic-logic unit acquires partition maps from the external memory, performs the convolution operation on the acquired partition maps, and stores the partition maps that have undergone the convolution operation, in the external memory. This reduces the amount of data of the input feature maps that are read out from the external memory. Accordingly, it is possible to reduce a decline in the efficiency of data transfer between the arithmetic-logic unit and the external memory. The contents of the above description are described in Embodiments 1, 2, and 3.

The arithmetic-logic unit may acquire all of the plurality of filter factors from the external memory before executing the convolution operation.

In this way, the arithmetic-logic unit acquires all of the filter factors from the external memory before execution of the convolution operation. This eliminates the need for the arithmetic-logic unit to acquire the filter factors simultaneously with the partition maps from the external memory. Accordingly, it is possible to reduce a decline in the efficiency of data transfer between the arithmetic-logic unit and the external memory. The contents of the above description are described in Embodiments 1, 2, and 3.

The arithmetic-logic unit may also execute the convolution operation on each of the plurality of first partition maps and the plurality of second partition maps, using the plurality of filter factors.

Accordingly, it is possible to reduce the number of filter factors that are acquired from the external memory and to reduce the amount of data that is read out from the external memory. This reduces a decline in the efficiency of data transfer between the arithmetic-logic unit and the external memory. The contents of the above description are described in Embodiments 1, 2, and 3.

The arithmetic-logic unit may store the plurality of first partition maps that have undergone the convolution operation, at adjacent addresses in the external memory.

Accordingly, it is possible to store the first partition maps in aggregated form in the external memory. Accordingly, the first partition maps transmitted and received between the arithmetic-logic unit and the external memory can be made into continuous and less discrete data. This reduces a decline in the efficiency of data transfer between the arithmetic-logic unit and the external memory. The contents of the above description are described in Embodiment 2.

The arithmetic-logic unit may also store the plurality of partition maps in the external memory, a total number of the plurality of partition maps corresponding to a maximum number of the plurality of partition maps that are used in the convolution operation and a convolution operation to be executed on a next layer.

Accordingly, when processing the next layer, the arithmetic-logic unit can acquire, from the external memory, the plurality of partition maps that are aggregated in accordance with the aforementioned maximum number of partitions. This improves the efficiency of data transfer between the arithmetic-logic unit and the external memory. The contents of the above description are described in Embodiment 2.

The arithmetic-logic unit may also store the plurality of partition maps in the external memory, a total number of the plurality of partition maps corresponding to the number of the plurality of input feature maps that are used in a convolution operation to be executed on a next layer.

Accordingly, when processing the next layer, the arithmetic-logic unit can acquire, from the external memory, the plurality of partition maps that are aggregated in accordance with the aforementioned number of the input feature maps. This improves the efficiency of data transfer between the arithmetic-logic unit and the external memory. The contents of the above description are described in Embodiment 2.

The arithmetic-logic unit may also store a plurality of partition maps in the external memory, the plurality of partition maps including both of boundaries of the plurality of partition maps that are used in the convolution operation and boundaries of the plurality of partition maps that are used in a convolution operation to be executed on a next layer.

Accordingly, when processing the next layer, the arithmetic-logic unit can acquire, from the external memory, the plurality of partition maps that are aggregated in accordance with the aforementioned boundaries of the partition maps.

This improves the efficiency of data transfer between the arithmetic-logic unit and the external memory. The contents of the above description are described in Embodiment 2.

The number of the plurality of input feature maps is an integer greater than or equal to 2, and $D \geq (d1+d2)/B1$ is satisfied, where D is the number of partitions, d1 is a data amount of the plurality of input feature maps, d2 is a data amount of a plurality of output feature maps after execution of the convolution operation, and B1 is a capacity of an internal memory of the arithmetic-logic unit.

Accordingly, it is possible to appropriately prescribe the number of the input feature maps and to appropriately improve the efficiency of data transfer between the arithmetic-logic unit and the external memory. The contents of the above description are described in Embodiments 1, 2, and 3.

An arithmetic processing system according to one embodiment of the present disclosure is an arithmetic processing system that executes a convolution operation. The arithmetic processing system includes an external memory that stores a plurality of input feature maps that have not yet undergone the convolution operation and a plurality of filter factors that are used in the convolution operation, and an arithmetic-logic unit that executes the convolution operation using the plurality of input feature maps and the plurality of filter factors.

The arithmetic-logic unit performs operations of 1) acquiring a plurality of first partition maps by acquiring a first partition map from each of the plurality of input feature maps stored in the external memory, the first partition map being one of n partition maps included in the input feature map, n being an integer greater than or equal to 2; executing the convolution operation on the plurality of first partition maps acquired from the external memory; and storing, in the external memory, the plurality of first partition maps that have undergone the convolution operation, and 2) acquiring a plurality of k-th partition maps by acquiring a k-th partition map from each of the plurality of input feature maps stored in the external memory, the k-th partition map being one of the n partition maps, k being an integer greater than or equal to 2 and less than or equal n; executing the convolution operation on the plurality of k-th partition maps acquired from the external memory; and storing, in the external memory, the plurality of k-th partition maps that have undergone the convolution operation.

In this way, the arithmetic-logic unit acquires partition maps from the external memory, performs the convolution operation on the acquired partition maps, and stores the partition maps that have undergone the convolution operation, in the external memory. This reduces the amount of data of the input feature maps that are read out from the external memory. Accordingly, it is possible to reduce a decline in the efficiency of data transfer between the arithmetic-logic unit and the external memory. The contents of the above description are described in Embodiments 1, 2, and 3.

A convolution operation method according to one embodiment of the present disclosure is a convolution operation method of executing a convolution operation on input data. The convolution operation method includes acquiring first partial data from each input data stored in an external memory, the first partial data being part of partial data included in each input data; executing the convolution operation on each first partial data acquired from the external memory; and storing, in the external memory, each first partial data that has undergone the convolution operation, and acquiring second partial data from each input data stored in the external memory, the second partial data being part of the partial data included in each input data; executing the convolution operation on each second partial data acquired from the external memory; and storing, in the external memory, each second partial data that has undergone the convolution operation.

In this way, the convolution operation method involves acquiring each partial data from the external memory, executing the convolution operation on the acquired partial data, and storing the partial data that has undergone the convolution operation, in the external memory. This reduces the amount of input data that is read out from the external memory. Accordingly, it is possible to reduce a decline in the efficiency of data transfer from the external memory.

In the above descriptions, each input data corresponds to each input feature map in Embodiments 1, 2, and 3, each partial data corresponds to each partition map in Embodiments 1, 2, and 3, each first partial data corresponds to each first partition map in Embodiments 1, 2, and 3, and each second partial data corresponds to each second partition map in Embodiments 1, 2, and 3.

An arithmetic processing system according to one embodiment of the present disclosure is an arithmetic processing system that executes a convolution operation. The arithmetic processing system includes an external memory that stores a plurality of input feature maps that have undergone the convolution operation and a plurality of filter factors that are used in the convolution operation, and an arithmetic-logic unit that executes a convolution operation using the plurality of input feature maps and the plurality of filter factors.

The arithmetic-logic unit performs at least operations of 1) acquiring compressed data of a plurality of first partition maps by acquiring compressed data of a first partition map from each of the plurality of input feature maps stored in the external memory, the first partition map being one of a plurality of partition maps included in the input feature map, 2) decompressing compressed data of the plurality of first partition maps acquired from the external memory, 3) executing the convolution operation on the plurality of first partition maps, and 4) compressing and storing data of the plurality of first partition maps that have undergone the convolution operation, in the external memory.

In this way, the arithmetic-logic unit acquires and decompresses the compressed data of the first partition map from the external memory, performs the convolution operation on the decompressed first partition map, and compresses and stores the first partition map that has undergone the convolution operation, in the external memory. This reduces the amount of data that is read out from the external memory and the amount of data that is written to the external memory. Accordingly, it is possible to reduce a decline in the efficiency of data transfer between the arithmetic-logic unit and the external memory. The contents of the above description are described in Embodiments 4, 5, and 6.

The arithmetic-logic unit may further perform operations of: 5) acquiring compressed data of a plurality of second partition maps by acquiring compressed data of a second partition map from each of the plurality of input feature maps stored in the external memory, the second partition map being one of the plurality of partition maps, 6) decompressing compressed data of the plurality of second partition maps acquired from the external memory, 7) executing the convolution operation on the plurality of second partition maps, and 8) compressing and storing data of the plurality of second partition maps that have undergone the convolution operation, in the external memory.

In this way, the arithmetic-logic unit acquires and decompresses compressed data of the second partition map from the external memory, performs the convolution operation on the decompressed second partition map, and compresses and stores the second partition map that has undergone the convolution operation, in the external memory. This reduces the amount of data that is read out from the external memory and the amount of data that is written to the external memory. Accordingly, it is possible to reduce a decline in the efficiency of data transfer between the arithmetic-logic unit and the external memory. The contents of the above description are described in Embodiments 4, 5, and 6.

The arithmetic-logic unit may acquire compressed data of the plurality of filter factors from the external memory before acquisition of compressed data of the plurality of first partition maps.

In this way, the arithmetic-logic unit acquires compressed data of all of the filter factors from the external memory before execution of the convolution operation. This eliminates the need for the arithmetic-logic unit to acquire the filter factors simultaneously with the partition maps from the external memory. Accordingly, it is possible to reduce a decline in the efficiency of data transfer between the arithmetic-logic unit and the external memory. The contents of the above description are described in Embodiments 4, 5, and 6.

The arithmetic-logic unit may also store the compressed data of the plurality of first partition maps that have undergone the convolution operation, at adjacent addresses in the external memory.

In this way, the arithmetic-logic unit can store the first partition maps in aggregated and compressed form in the external memory. Therefore, the first partition maps that are transmitted and received between the arithmetic-logic unit and the external memory can be made into continuous and less discrete data. This reduces a decline in the efficiency of data transfer between the arithmetic-logic unit and the external memory. The contents of the above description are described in Embodiment 5.

The arithmetic-logic unit may store compressed data of the plurality of partition maps in the external memory, a total number of the plurality of partition maps corresponding to a maximum number of the plurality of partition maps that are used in the convolution operation and a convolution operation to be executed on a next layer.

Accordingly, when processing the next layer, the arithmetic-logic unit can acquire, from the external memory, the plurality of partition maps that are aggregated and compressed in accordance with the aforementioned maximum number of partitions. This improves the efficiency of data transfer between the arithmetic-logic unit and the external memory. The contents of the above description are described in Embodiment 5.

The arithmetic-logic unit may store compressed data of the plurality of partition maps in the external memory, a total number of the plurality of partition maps corresponding to the number of the plurality of input feature maps that are used in a convolution operation to be executed on a next layer.

Accordingly, when processing the next layer, the arithmetic-logic unit can acquire, from the external memory, the plurality of partition maps that are aggregated and compressed in accordance with the aforementioned number of the input feature maps. This improves the efficiency of data transfer between the arithmetic-logic unit and the external memory. The contents of the above description are described in Embodiment 5.

The arithmetic-logic unit may store compressed data of a plurality of partition maps in the external memory, the plurality of partition maps including both of boundaries of the plurality of partition maps that are used in the convolution operation and boundaries of the plurality of partition maps that are used in a convolution operation to be executed on a next layer.

Accordingly, when processing the next layer, the arithmetic-logic unit can acquire, from the external memory, the plurality of partition maps that are aggregated and compressed in accordance with the aforementioned boundaries of the partition maps. This improves the efficiency of data transfer between the arithmetic-logic unit and the external memory. The contents of the above description are described in Embodiment 5.

An arithmetic processing system according to one embodiment of the present disclosure is an arithmetic processing system that executes a convolution operation. The arithmetic processing system includes an external memory that stores a plurality of input feature maps that have not yet undergone the convolution operation and a plurality of filter factors that are used in the convolution operation, and an arithmetic-logic unit that executes a convolution operation using the plurality of input feature maps and the plurality of filter factors.

The arithmetic-logic unit performs at least operations of 1) acquiring compressed data of a plurality of first partition maps by acquiring compressed data of a first partition map from each of the plurality of input feature maps stored in the external memory, the first partition map being one of n partition maps included in the input feature map, where n being an integer greater than or equal to 2, 2) decompressing compressed data of the plurality of first partition maps acquired from the external memory, 3) executing the convolution operation on the plurality of first partition maps, 4) compressing and storing data of the plurality of first partition maps that have undergone the convolution operation, in the external memory, 5) acquiring compressed data of a plurality of k-the partition maps by acquiring compressed data of a k-th partition map from each of the plurality of input feature maps stored in the external memory, the k-th partition map being one of the n partition maps, where k being an integer greater than or equal to 2, 6) decompressing compressed data of the plurality of k-th partition maps acquired from the external memory, 7) executing the convolution operation on the plurality of k-th partition maps, and 8) compressing and storing data of the plurality of k-th partition maps that have undergone the convolution operation, in the external memory.

In this way, the arithmetic-logic unit acquires and decompresses compressed data of the partition maps from the external memory, performs the convolution operation on the decompressed partition maps, and compresses and stores the partition maps that have undergone the convolution operation, in the external memory. This reduces the amount of data that is read out from the external memory and the amount of data that is written to the external memory. Accordingly, it is possible to reduce a decline in the efficiency of data transfer between the arithmetic-logic unit and the external memory. The contents of the above description are described in Embodiments 4, 5, and 6.

A convolution operation method according to one embodiment of the present disclosure is a convolution operation method of executing a convolution operation on input data. The convolution operation method includes acquiring compressed data of first partial data from each input data stored in an external memory, the first partial data being part of partial data included in each input data, decompressing compressed data of each first partial data acquired from the external memory, executing the convolution operation on each first partial data, and compressing and storing each first partial data that has undergone the convolution operation, in the external memory.

In this way, the convolution operation method involves acquiring each partial data from the external memory, executing the convolution operation on the acquired partial data, and storing the partial data that has undergone the convolution operation, in the external memory. This reduces the amount of data that is read out from the external memory and the amount of data that is written to the external memory. Accordingly, it is possible to reduce a decline in the efficiency of data transfer from the external memory. The contents of the above description are described in Embodiments 4, 5, and 6.

In the above descriptions, each input data corresponds to each input feature map in Embodiments 4, 5, and 6, each partial data corresponds to each partition map in Embodiments 4, 5, and 6, and each first partial data corresponds to each first partition map in Embodiments 4, 5, and 6.

[Logic Behind Achievement of Present Disclosure]

How the present disclosure has been achieved will be described with reference to FIGS. 1 to 3.

FIG. 1 is a schematic diagram illustrating convolution neural network 5.

Convolution neural network 5 illustrated in FIG. 1 is one of deep learning networks and is configured by an intermediate layer in which a plurality of feature extraction layers are hierarchically connected to one another, and a fully connected layer provided on the downstream of the intermediate layer. Depending on the configuration, the convolution neural network may not include the fully connected layer, or may include a layer other than the fully connected layer on the downstream of the intermediate layer.

Convolution neural network 5 is used for the purpose of, for example, recognizing an image of a predetermined shape and pattern from image data. When convolution neural network 5 is used in image recognition, a convolution operation is performed on an image to generate a feature map (tensor obtained from the convolution operation), and a convolution operation is further performed on the generated feature map to form the next feature map. In this way, these processes are repeated to extract the features of the image. Convolution neural network 5 consumes a large processing capability for the convolution operations, and therefore it is desired to improve the efficiency of processing for the convolution operations.

Now, arithmetic processing system 101 according to a comparative example will be described.

Figure 2:
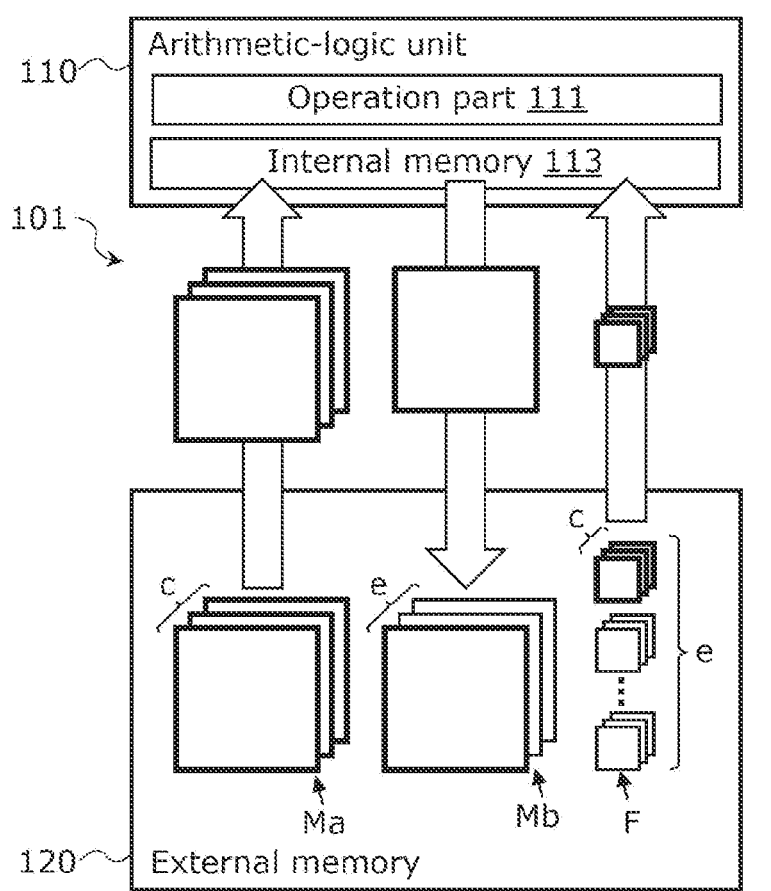
FIG. 2 is a schematic diagram illustrating an arithmetic processing system according to a comparative example.

FIG. 2 is a schematic diagram illustrating arithmetic processing system 101 according to the comparative example. FIG. 3 is a diagram illustrating an overview of a convolution operation process of arithmetic processing system 101 according to the comparative example.

As illustrated in FIG. 2, arithmetic processing system 101 according to the comparative example includes arithmetic-logic unit 110 and external memory 120.

Arithmetic-logic unit 110 includes operation part 111 that executes convolution operations and internal memory 113 that temporarily stores data that is input to arithmetic-logic unit 110 and data that is output from operation part 111. External memory 120 stores a plurality of input feature maps Ma that have not yet undergone the convolution operations, a plurality of output feature maps Mb that have undergone the convolution operations, and a plurality of filter factors F that are used in the convolution operations. In the example in FIG. 2, c channels of input feature maps Ma, (c×e) filter factors F, and e channels of output feature maps Mb are stored in external memory 120.

Figure 3:
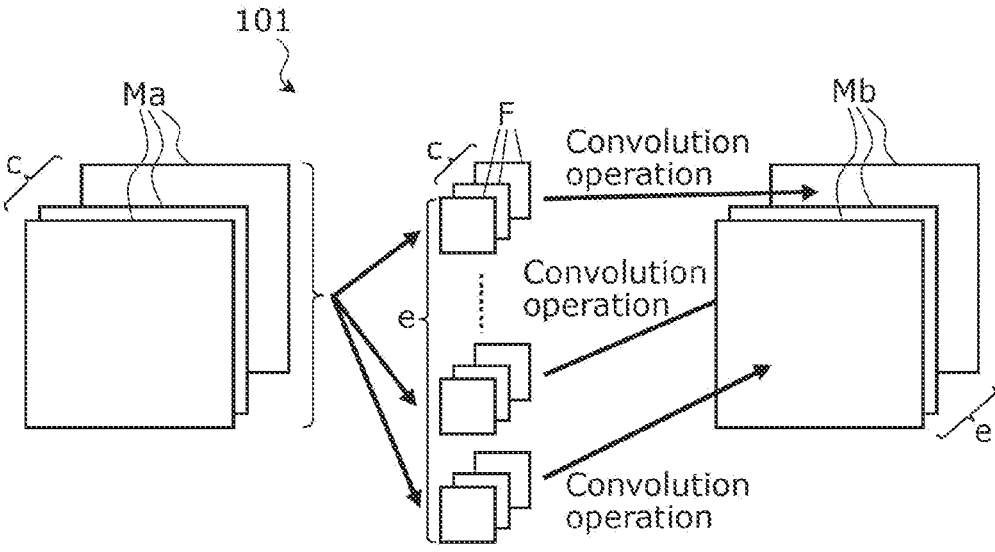
FIG. 3 is a diagram illustrating an overview of a convolution operation process of the arithmetic processing system according to the comparative example.

In arithmetic processing system 101, as illustrated in FIG. 3, arithmetic-logic unit 110 acquires a plurality of input feature maps Ma from external memory 120, executes convolution operations on the plurality of (i.e., c) input feature maps Ma by multiplications by filter factors F, and stores output feature maps Mb that have undergone the convolution operations, in external memory 120. Arithmetic-logic unit 110 repeats the aforementioned operations and other steps a given number of times corresponding to the number of filter factors F, generates a plurality of (i.e., e) output feature maps Mb, a total number of which corresponds to the number of filter factors F, and stores generated output feature maps Mb in external memory 120.

FIGS. 2 and 3 show the case in which convolution operations are performed on a given one feature extraction layer, and shows only data that is used in the convolution operations as data stored in external memory 20. The following description is, unless otherwise specified, given of a case in which convolution operations are performed on a given one feature extraction layer.

Arithmetic processing system 101 described above necessitates all input feature maps Ma to generate single output feature map Mb, but ordinarily cannot continue to store all input feature maps Ma in internal memory 113 due to large data amount of input feature maps Ma. Therefore, it is necessary to acquire all input feature maps Ma from external memory 120 every time single output feature map Mb is generated. This consequently increases the number of times arithmetic-logic unit 110 reads out input feature maps Ma from external memory 120 and increases the amount of data transfer between arithmetic-logic unit 110 and external memory 120. Thus, there is a problem that the efficiency of data transfer will decline.

In contrast, the arithmetic processing system according to one embodiment of the present disclosure has the following configuration and reduces the decline in the efficiency of data transfer.

Hereinafter, embodiments will be described in detail with reference to the accompanying drawings.

Each exemplary embodiment described below shows a general or specific example. Numerical values, shapes, materials, constituent elements, layout positions and connection forms of constituent elements, steps, a sequence of steps, and so on in the following embodiment are mere examples and do not intend to limit the scope of the present disclosure. Among constituent elements described in the following description, those that are not recited in any independent claim, which represents the broadest concept, are described as optional constituent elements. Each drawing is a schematic diagram and does not always provide precise depiction. Substantially the same constituent elements are given the same reference signs throughout the drawings. The present disclosure also includes any mode achieved by any combination of two or more of a plurality of embodiments.

Embodiment 1

Arithmetic processing system 1 according to Embodiment 1 will be described with reference to FIGS. 4A to 6. Embodiment 1 describes an example in which an arithmetic-logic unit acquires input feature maps Ma in small batches.

Figure 4A:
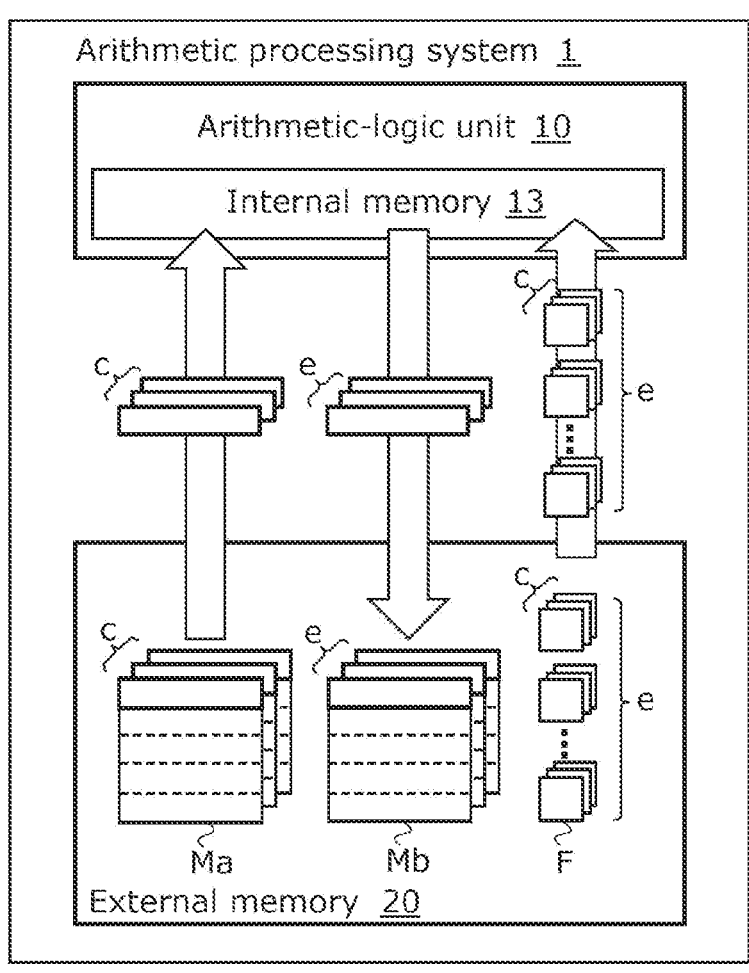
FIG. 4A is a schematic diagram illustrating an arithmetic processing system according to Embodiment 1.
Figure 4B:
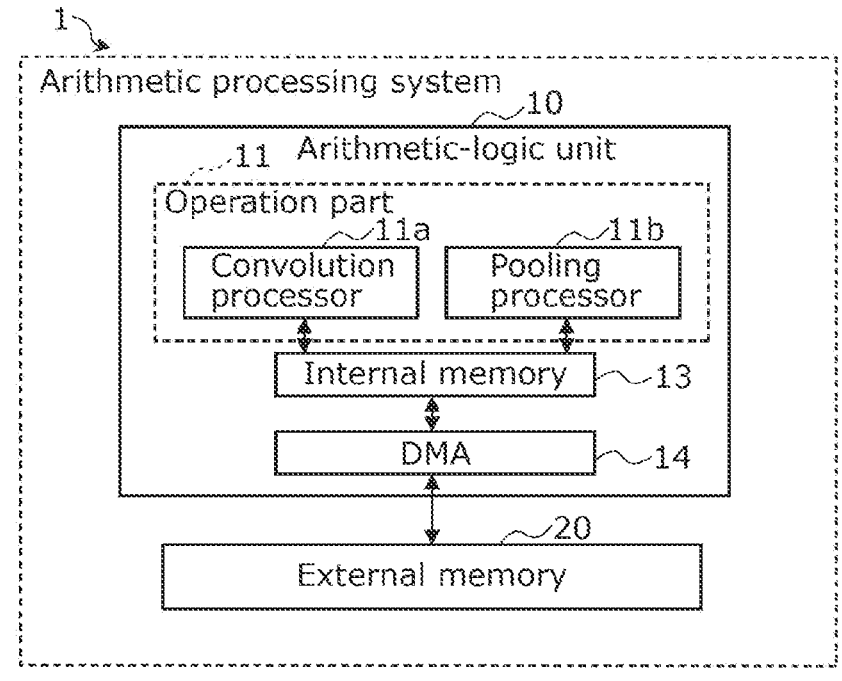
FIG. 4B is a block diagram illustrating a functional configuration of the arithmetic processing system according to Embodiment 1.

FIG. 4A is a schematic diagram illustrating arithmetic processing system 1 according to Embodiment 1. FIG. 4B is a block diagram illustrating a functional configuration of arithmetic processing system 1.

As illustrated in FIGS. 4A and 4B, arithmetic processing system 1 includes arithmetic-logic unit 10 that executes convolution operations and external memory 20 connected to arithmetic-logic unit 10.

External memory 20 is provided outside arithmetic-logic unit 10 and inside arithmetic processing system 1. External memory 20 stores a plurality of input feature maps Ma that have not yet undergone operations, a plurality of output feature maps Mb that have undergone operations, and a plurality of filter factors F that are used in convolution operations. External memory 20 may, for example, be a readable and writable recording medium such as a dynamic random access memory (DRAM).

Arithmetic-logic unit 10 is a device that executes convolution operations using input feature maps Ma and filter factors F. As illustrated in FIG. 4B, arithmetic-logic unit 10 includes operation part 11, internal memory 13 connected to operation part 11, and direct memory access (DMA) 14 connected to internal memory 13. In FIG. 4A, operation part 11 and DMA 14 are not shown. Arithmetic-logic unit 10 may, for example, be an accelerator that supports to enhance the speed of computer processing.

Operation part 11 includes convolution processor 11a that performs convolution processing and pooling processor 11b that performs pooling processing. Internal memory 13 has the function of temporarily storing data that is input from external memory 20 via DMA 14 and data that is output from operation part 11. DMA 14 has the function of outputting data that is read out from external memory 20 to internal memory 13 and outputting data that is temporarily stored in internal memory 13 to external memory 20. Note that operation part 11 may include at least convolution processor 11a and does not necessarily have to include pooling processor 11b, or may include other processors.

Figure 5:
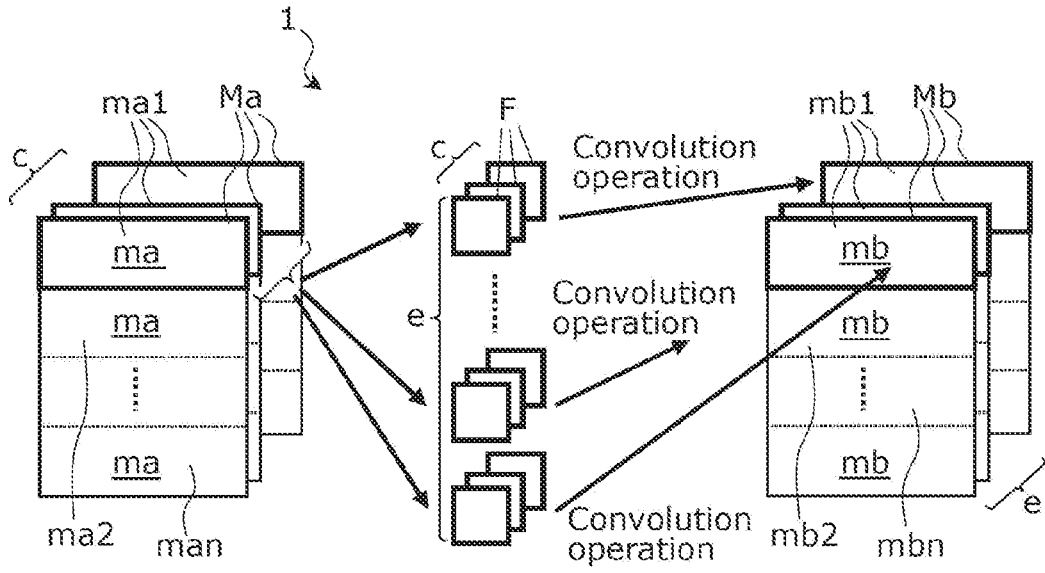
FIG. 5 is a diagram illustrating an overview of a convolution operation process of the arithmetic processing system according to Embodiment 1.

FIG. 5 is a diagram illustrating an overview of a convolution operation process of arithmetic processing system 1 according to Embodiment 1.

FIG. 5 illustrates c channels of input feature maps Ma, (c×e) filter factors F, and e channels of output feature maps Mb. FIG. 5 shows an example in which each input feature map Ma is configured by a plurality of subdivided partition maps ma. Each partition map ma is partial data of input feature map Ma. FIG. 5 also shows an example in which each output feature map Mb is configured by a plurality of subdivided partition maps mb. Each partition map mb is partial data of output feature map Mb.

FIG. 5 illustrates first partition map ma1, second partition map ma2, and n-th partition map man as n partition maps that configure each input feature map Ma, where n is an integer greater than or equal to 2.

For example, arithmetic-logic unit 10 acquires first partition map ma1 out of a plurality of partition maps ma from each input feature map Ma and executes convolution operations on each of a plurality of (i.e., c) acquired first partition maps ma1 by multiplications by filter factors F to generate first partition map mb1 that have undergone the convolution operation. Arithmetic-logic unit 10 repeats the aforementioned operation and other steps a given number of times corresponding to the number of filter factors F so as to generate a plurality of (i.e., e) first partition maps mb1 that have undergone the convolution operations, a total number of which corresponds to the number of filter factors F.

The number of input feature maps Ma is an integer greater than or equal to 2 and is determined to such a size (data amount) that partition maps ma and other data can be stored in internal memory 13 of arithmetic-logic unit 10.

Specifically, a total number of input feature maps Ma is determined to satisfy Expression 1 below, where D is the number of partitions, d1 is the data amount of all of a plurality of input feature maps Ma, d2 is the data amount of all of a plurality of output feature maps Mb obtained by execution of the convolution operations, and B1 is the capacity of internal memory 13 of arithmetic-logic unit 10.

$$D \geq (d1 + d2)/B1 \qquad \text{[Expression 1]}$$

Next, processing operations of arithmetic processing system 1 will be described.

Figure 6:
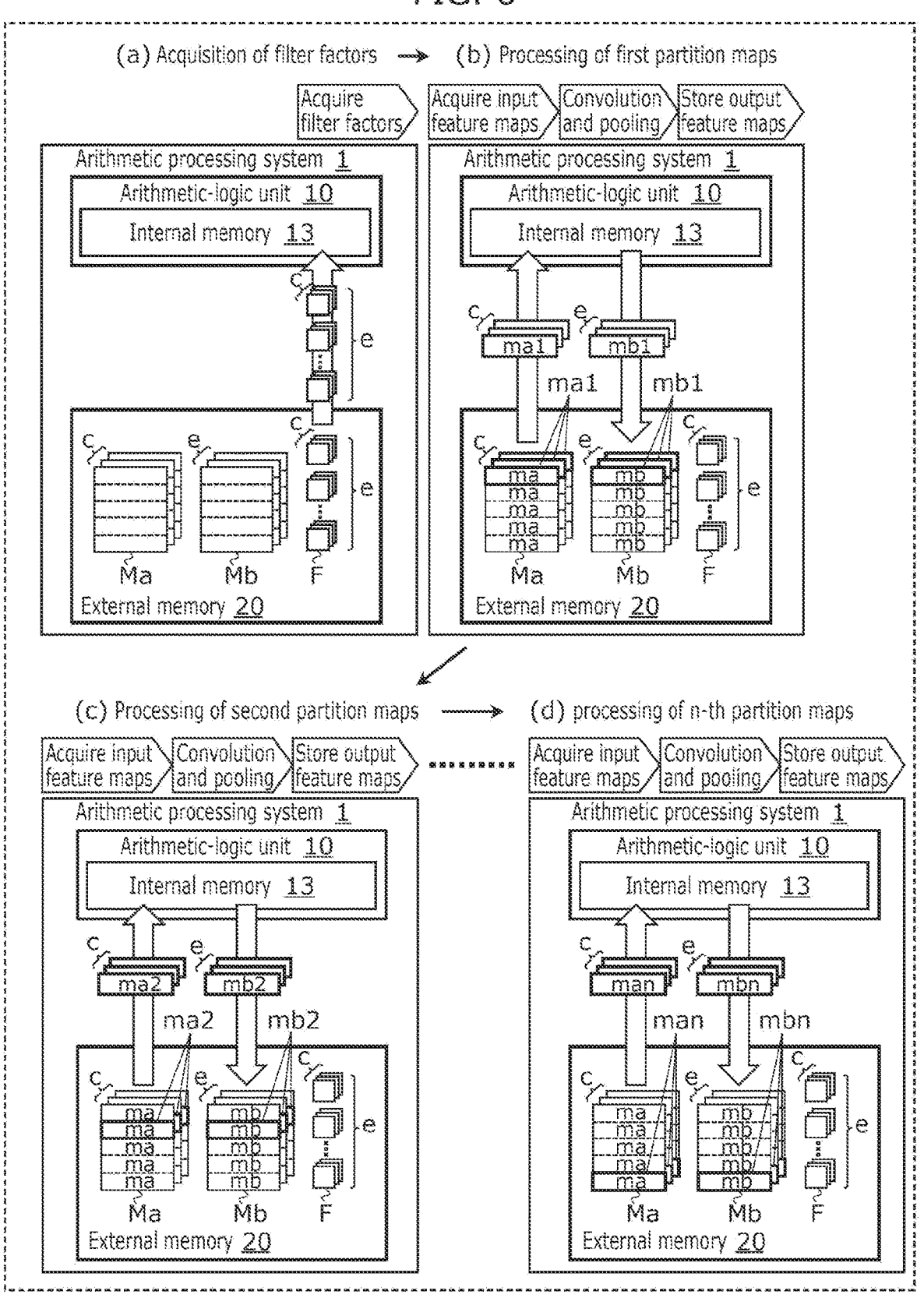
FIG. 6 is a schematic diagram illustrating processing operations of the arithmetic processing system according to Embodiment 1.

FIG. 6 is a schematic diagram illustrating the processing operations of arithmetic processing system 1. In FIG. 6, (a) to (d) are executed in this order.

As illustrated in (a) in FIG. 6, arithmetic-logic unit 10 acquires all of a plurality of filter factors F from external memory 20 before execution of convolution operations. An example in which (c×e) filter factors F are output from external memory 20 to internal memory 13 of arithmetic-logic unit 10 is shown in (a) in FIG. 6. As illustrated in (b) in FIG. 6, arithmetic-logic unit 10 acquires first partition map ma1 out of a plurality of partition maps ma from each of a plurality of input feature maps Ma stored in external memory 20. Then, arithmetic-logic unit 10 executes convolution operations on each of the plurality of (e.g., c) first partition maps ma1 acquired from external memory 20 by multiplications by filter factors F to generate first partition map mb1. Arithmetic-logic unit 10 repeats the aforementioned operation and other steps a given number of times corresponding to the number of filter factors F so as to generate a plurality of (i.e., e) of first partition maps mb1 that have undergone the convolution operations, a total number of which corresponds to the number of filter factors F, and stores first partition maps mb1 in external memory 20. Note that first partition maps mb1 stored in external memory 20 configure parts of input feature maps that are read out before execution of the convolution operations to be executed on the next layer.

As illustrated in (c) in FIG. 6, arithmetic-logic unit 10 acquires second partition map ma2 out of partition maps ma from each input feature map Ma stored in external memory 20. Then, arithmetic-logic unit 10 executes convolution operations on each of the plurality of (i.e., c) second partition maps ma2 acquired from external memory 20 by multiplications by filter factors F to generate second partition map mb2. Arithmetic-logic unit 10 repeats the aforementioned operation and other steps a given number of times corresponding to the number of filter factors to generate a plurality of (i.e., e) second partition maps mb2 that have undergone the convolution operations, a total number of which corresponds to the number of filter factors F, and stores second partition maps mb2 in external memory 20. Note that second partition maps mb2 stored in external memory 20 configure parts of the input feature maps that are read out before execution of the convolution operations to be executed on the next layer.

Arithmetic-logic unit 10 repeats the same processing as described above n times. Specifically, as illustrated in (d) in FIG. 6, arithmetic-logic unit 10 acquires n-th partition map man out of partition maps ma from each input feature map Ma stored in external memory 20. Then, arithmetic-logic unit 10 performs convolution operations on each of the plurality of (e.g., c) n-th partition maps man acquired from external memory 20 by multiplications by filter factors F to generate n-th partition map mbn. Arithmetic-logic unit 10 repeats the aforementioned operation and other steps a given number of times corresponding to the number of filter factors F to generate a plurality of (i.e., e) n-th partition maps mbn that have undergone the convolution operations, a total number of which corresponds to the number of filter factors F, and stores n-th partition maps mbn in external memory 20.

Accordingly, all output feature maps Mb, a total number of which corresponds to the number of filter factors F, are generated, and the processing of a single feature extraction layer ends. Subsequent to the processing of the first feature extraction layer, the processing of the second feature extraction layer is performed. When the processing of a prescribed number of layers has been completed, the processing of the intermediate layer of the convolution neural network is completed.

Note that the convolution operations may also be performed without storing filter factors F in internal memory 13. In that case, the processing illustrated in (a) in FIG. 6 is unnecessary, and the convolution operations illustrated in (b) to (d) in FIG. 6 are performed using filter factors F that are acquired, not from internal memory 13, but from external memory 20. This eliminates the need to store filter factors F in internal memory 13 and enables a reduction in the size of internal memory 13.

Arithmetic processing system 1 described above can reduce the amount of data (total value) of a plurality of input feature maps Ma that is read out from external memory 20 and can reduce the amount of data transfer as compared with the amount of data transfer in arithmetic processing system 101 according to the comparative example. This reduces a decline in the efficiency of data transfer between arithmetic-logic unit 10 and external memory 20.

Embodiment 2

Arithmetic processing system 1A according to Embodiment 2 will be described. Embodiment 2 describes an example in which the partition maps that have undergone convolution operations are not discretized and are stored in appropriately aggregated form in external memory 20.

To clarify the difference from Embodiment 2, external memory 20 of arithmetic processing system 1 according to Embodiment 1 will be described.

Figure 7:
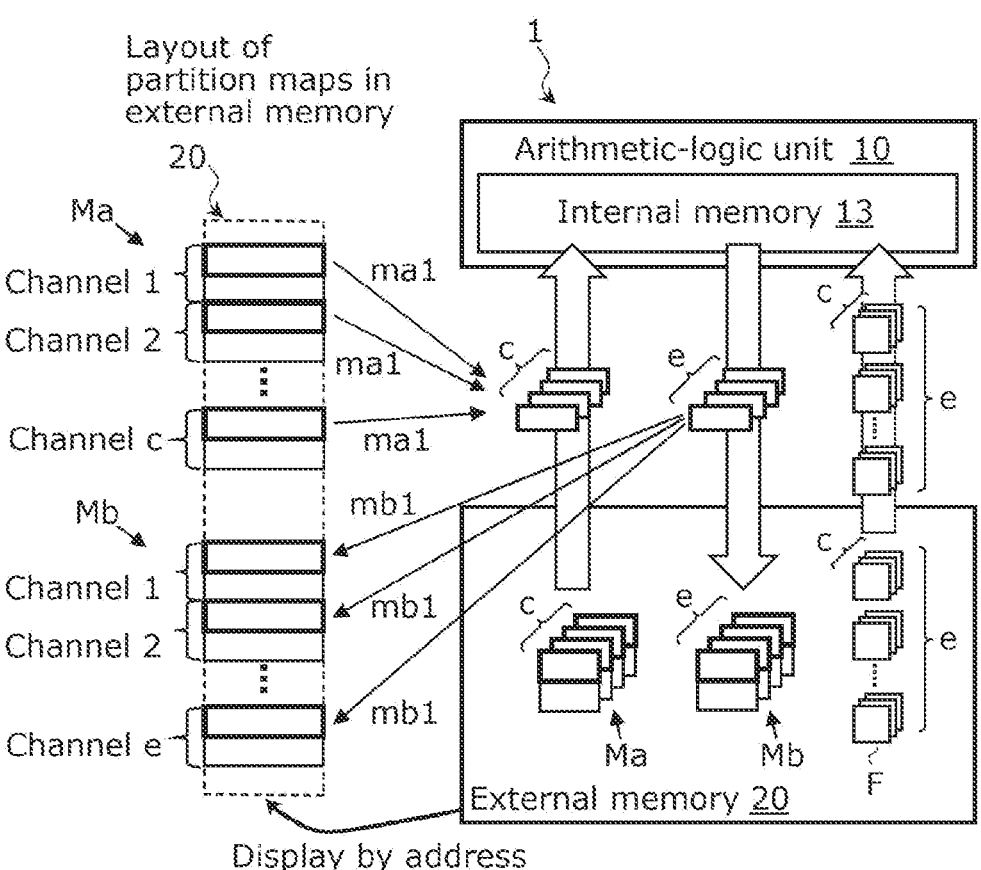
FIG. 7 is a schematic diagram illustrating a layout of partition maps in an external memory of the arithmetic processing system according to Embodiment 1.

FIG. 7 is a schematic diagram illustrating partition maps stored in external memory 20 of arithmetic processing system 1 according to Embodiment 1. Input feature maps Ma and output feature maps Mb are respectively stored in aggregated form in external memory 20, and in each of input feature maps Ma and output feature maps Mb, feature maps belonging to each single channel are aggregated and stored in the order of channel number from channel 1 to channel 2 and so on.

Thus, when a convolution operation is performed for each partition map as in Embodiment 1, arithmetic-logic unit 10 reads a plurality of partition maps (e.g., ma1) from discrete locations (random locations) in external memory 20 and writes a plurality of partition maps (e.g., mb1) to discrete locations in external memory 20. In convolution neural network 5, a later layer has a smaller map size and a larger number of channels (see FIG. 1), and in external memory 20, a later layer has partition maps with small amounts of data discretized to each channel. For example, when external memory 20 is a DRAM, it is desirable that large continuous data be transferred in the memory in order to improve the efficiency of data transfer from external memory 20 to arithmetic-logic unit 10. However, in external memory 20 of Embodiment 1, a later layer has smaller data discretized to a larger number of locations and accordingly suffers a decline in the efficiency of data transfer. In view of this, in Embodiment 2, for example a plurality of first partition maps mb1 that have undergone operations are stored in external memory 20 so as to be located at adjacent addresses in external memory 20.

Figure 8:
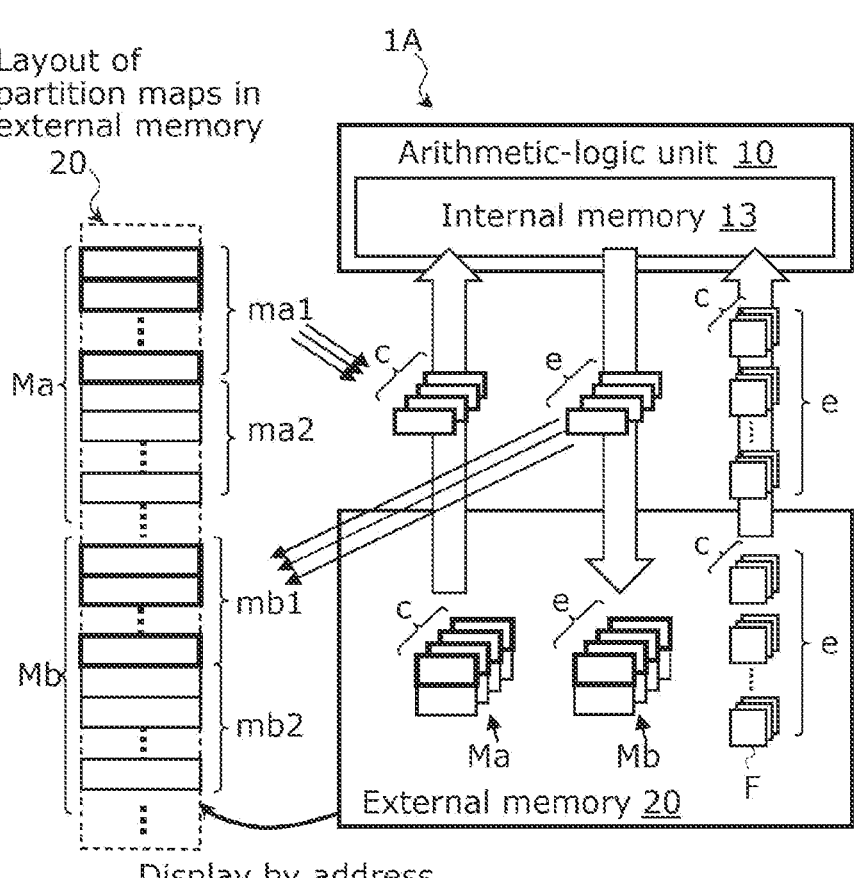
FIG. 8 is a schematic diagram illustrating a layout of partition maps in the external memory of an arithmetic processing system according to Embodiment 2.

FIG. 8 is a schematic diagram illustrating the layout of partition maps in external memory 20 of arithmetic processing system 1A according to Embodiment 2. FIG. 8 shows that a plurality of first partition maps mb1 that have undergone operations are allocated at adjacent addresses in external memory 20. In external memory 20, not only first partition maps mb1, but also a plurality of second partition maps mb2 and a plurality of n-th partition maps mbn are also respectively allocated in aggregated form in output feature maps Mb.

Output feature maps Mb are used as input feature maps Ma in the convolution operations to be executed on the next layer. Thus, if partition maps of output feature maps Mb are allocated in aggregated form in external memory 20, partition maps of input feature maps Ma that are used in execution of the convolution operations to be executed on the next layer are also allocated in aggregated form in external memory 20. Specifically, a plurality of first partition maps ma1, a plurality of second partition maps ma2, and a plurality of n-th partition maps man are respectively allocated in aggregated form in a plurality of input feature maps Ma.

In this way, the partition maps (e.g., ma1) of the input feature maps and the partition maps (e.g., mb1) of the output feature maps are respectively allocated in aggregated form in external memory 20. This makes data to be transmitted and received between arithmetic-logic unit 10 and external memory 20 into continuous less-discrete data. Accordingly, it is possible to reduce a decline in the efficiency of data transfer between arithmetic-logic unit 10 and external memory 20.

[Variation 1 of Embodiment 2]

Arithmetic processing system 1A according to Variation 1 of Embodiment 2 will be described with reference to FIGS. 9 and 10. Variation 1 describes an example in which the size of partition maps mb to be stored in external memory 20 is determined according to the partition maps that are used in the convolution operations executed on the currently processing layer or the convolution operations to be executed on the next layer.

Figure 9:
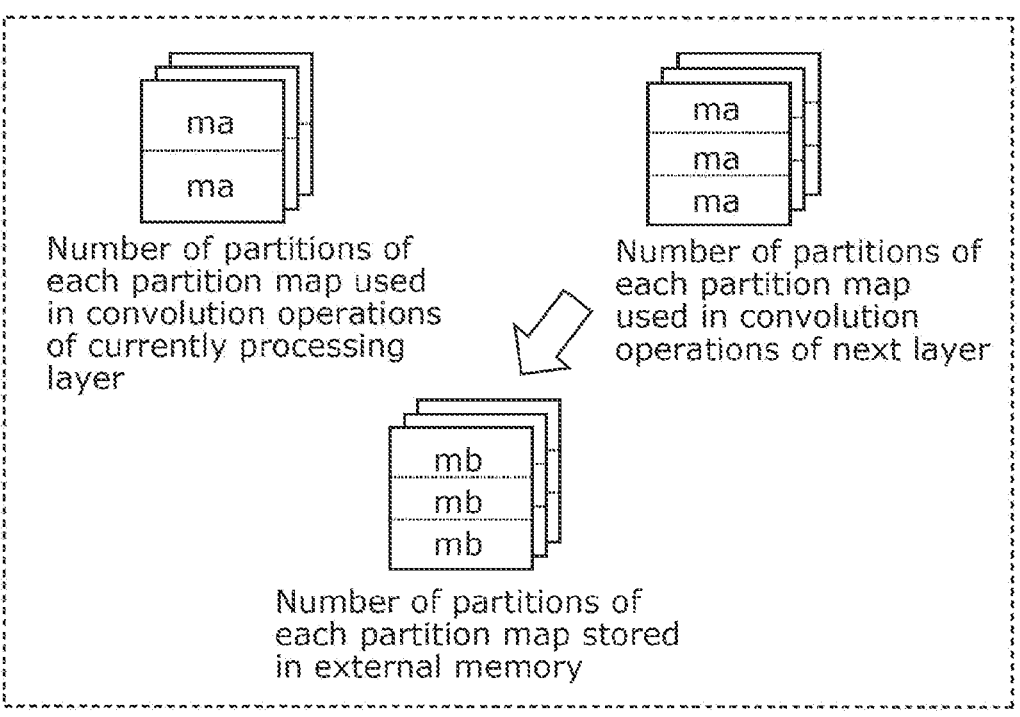
FIG. 9 is a schematic diagram illustrating partition maps used in arithmetic processing of an arithmetic processing system according to Variation 1 of Embodiment 2.
Figure 10:
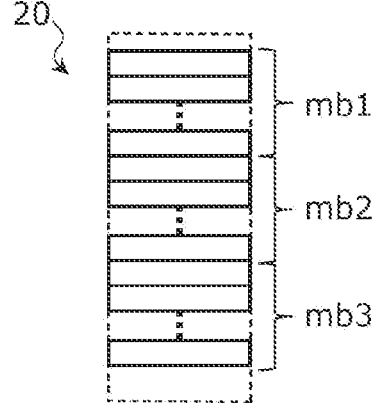
FIG. 10 is a schematic diagram illustrating partition maps stored in the external memory according to Variation 1 of Embodiment 2.

FIG. 9 is a schematic diagram illustrating partition maps ma and mb used in arithmetic processing of arithmetic processing system 1A according to Variation 1. FIG. 10 is a schematic diagram illustrating partition maps mb1 to mb3 stored in external memory 20 according to Variation 1.

FIG. 9 shows an example in which the number of partition maps ma that are used in the convolution operations executed on the currently processing layer is two, and the number of partition maps ma that are used in the convolution operations to be executed on the next layer is three. In this case, arithmetic-logic unit 10 compares the number of partition maps ma that are used in the convolution operations to be executed on the next layer and the number of partition maps ma that are used in the convolution operations executed on the currently processing layer and selects a larger number of partitions. In the example illustrated in FIG. 9, each output feature map Mb is partitioned in accordance with the selected number of partitions (i.e., into three) to obtain partition maps mb, and arithmetic-logic unit

10 stores partition maps mb1 to mb3 out of partition maps mb respectively in aggregated form in external memory 20. Note that arithmetic-logic unit 10 performs convolution operations on partition maps ma1 and ma2 out of partition maps ma obtained by partitioning each input feature map Ma into two, and stores this result in the external memory such that partition maps mb1 to mb3 are respectively stored in aggregated form in external memory 20. As a result, as illustrated in FIG. 10, a plurality of partition maps mb1, a plurality of partition maps mb2, and a plurality of partition maps mb3 are respectively stored in aggregated form in external memory 20.

In this way, arithmetic-logic unit 10 according to Variation 1 stores a plurality of partition maps mb in external memory 20 such that the plurality of partition maps mb are aggregated in accordance with the maximum number of partitions out of a plurality of partition maps ma that are used in the convolution operations executed on the currently processing layer and the convolution operations to be executed on the next layer. Accordingly, arithmetic-logic unit 10 is capable of acquiring a plurality of partition maps ma in aggregated form from external memory 20 when performing the convolution operations on the next layer. This improves the efficiency of data transfer between arithmetic-logic unit 10 and external memory 20.

Note that the number of partition maps mb is not limited the maximum number of partitions, and arithmetic-logic unit 10 may store, in external memory 20, partition maps mb that are each partitioned in accordance with a total number of partition maps ma that are used in the convolution operations to be executed on the next layer, i.e., a total number of input feature maps Ma that are used in the convolution operations to be executed on the next layer.

Moreover, arithmetic-logic unit 10 may partition partition maps ma used in the convolution operations executed on the currently processing layer in accordance with the number of partition maps ma that are used in the convolution operations to be executed on the next layer. The example illustrated in FIG. 9 corresponds to the case in which the number of partition maps ma for the currently processing layer is three. Accordingly, a total number of partition maps ma that are used in convolution operations becomes equal to a total number of partition maps mb that are aggregated in the external memory, and as a result, a total number of partitions used in convolution operations becomes equal to a total number of partitions used in aggregation in the external memory. This facilitates control of the arithmetic processing of arithmetic-logic unit 10.

When storing a plurality of partition maps mb1 to mb3 in external memory 20, arithmetic-logic unit 10 may output information that indicates boundary locations of partition maps mb1 to mb3 to external memory 20. External memory 20 may store the relationship between partition maps mb1 to mb3 and the information indicating the aforementioned boundary locations in the form of table data.

[Variation 2 of Embodiment 2]

Arithmetic processing system 1A according to Variation 2 of Embodiment 2 will be described with reference to FIGS. 11 and 12. Variation 2 describes an example in which partition map mb to be stored in external memory 20 are generated using both partition boundaries that are used in the convolution operations executed on the currently processing layer and the convolution operations to be executed on the next layer.

Figure 11:
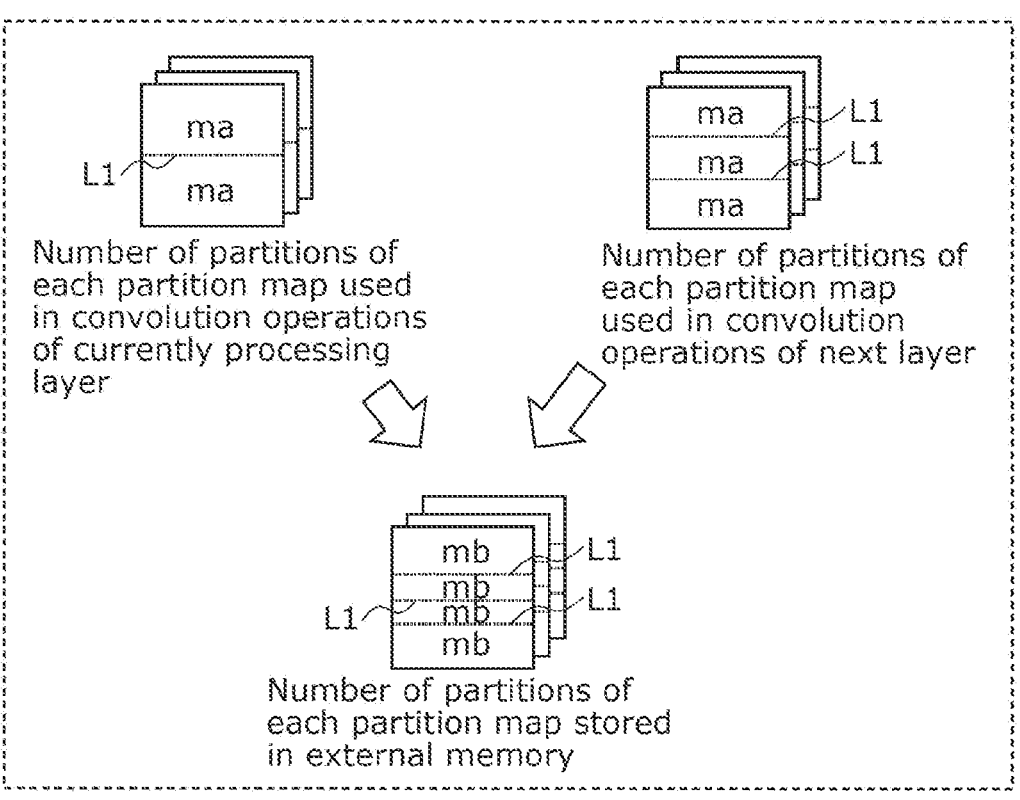
FIG. 11 is a schematic diagram illustrating partition maps used in arithmetic processing of an arithmetic processing system according to Variation 2 of Embodiment 2.

FIG. 11 is a schematic diagram illustrating partition maps ma and mb that are subjected to arithmetic processing of arithmetic processing system 1A according to Variation 2.

Figure 12:
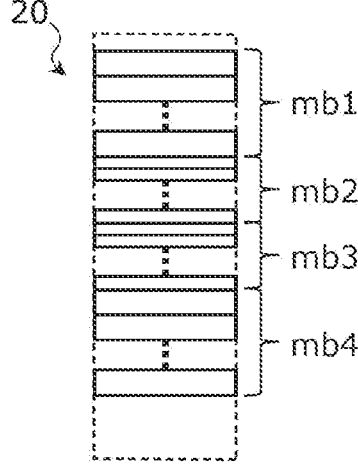
FIG. 12 is a schematic diagram illustrating partition maps stored in the external memory according to Variation 2 of Embodiment 2.

FIG. 12 is a schematic diagram illustrating partition maps mb1 to mb4 stored in external memory 20 according to Variation 2.

FIG. 11 shows an example in which the number of partition maps ma that are used in the convolution operations executed on the currently processing layer is two, and an example in which the number of partition maps ma that are used in the convolution operations to be executed on the next layer is three. Boundaries L1 of partition maps ma are different between these two examples. According to Variation 2, a plurality of partition maps mb, namely partition maps mb1 to mb4, each include both boundaries L1 of partition maps ma that are used in the convolution operations executed on the currently processing layer and boundaries L1 of partition maps ma that are used in the convolution operations to be executed on the next layer and are respectively stored in aggregated form in external memory 20. As a result, as illustrated in FIG. 12, a plurality of partition maps mb1, a plurality of partition maps mb2, a plurality of partition maps mb3, and a plurality of partition maps mb4 are respectively stored in aggregated form in external memory 20.

In this way, arithmetic-logic unit 10 according to Variation 2 stores, in external memory 20, a plurality of partition maps mb (mb1 to mb4) each including both of boundaries L1 of a plurality of partition maps that are used in the convolution operations executed on the currently processing layer and boundaries L1 of a plurality of partition maps that are used in the convolution operation to be executed on the next layer. Accordingly, arithmetic-logic unit 10 is capable of acquiring a plurality of partition maps ma in aggregated form from external memory 20 when performing the convolution operations to be executed on the next layer. This improves the efficiency of data transfer between arithmetic-logic unit 10 and external memory 20.

Note that arithmetic-logic unit 10 may partition each partition map ma that is used in the convolution operations executed on the currently processing layer in accordance with the number of partition maps ma that are used in the convolution operations to be executed on the next layer. The example illustrated in FIG. 12 corresponds to the case in which the number of partition maps ma that are used in the convolution operations executed on the currently processing layer is four.

Alternatively, arithmetic-logic unit 10 may partition each partition map ma in such partition form that includes both boundaries L1 (in the example illustrated in FIG. 11, into four). Accordingly, a total number of partition maps ma that are used in convolution operations becomes equal to a total number of partition maps mb that are aggregated in the external memory, and as a result, a total number of partitions used in convolution operations becomes equal to a total number of partitions used in the map aggregation in the external memory. This facilitates control of the arithmetic processing of arithmetic-logic unit 10.

Embodiment 3

Arithmetic processing system 1B according to Embodiment 3 will be described. Although the example of generating single output feature map Mb from all input feature maps Ma has been described in Embodiment 1, Embodiment 3 describes an example in which a plurality of input feature maps Ma are divided into a plurality of groups and one output feature map is generated for each group.

Figure 13:
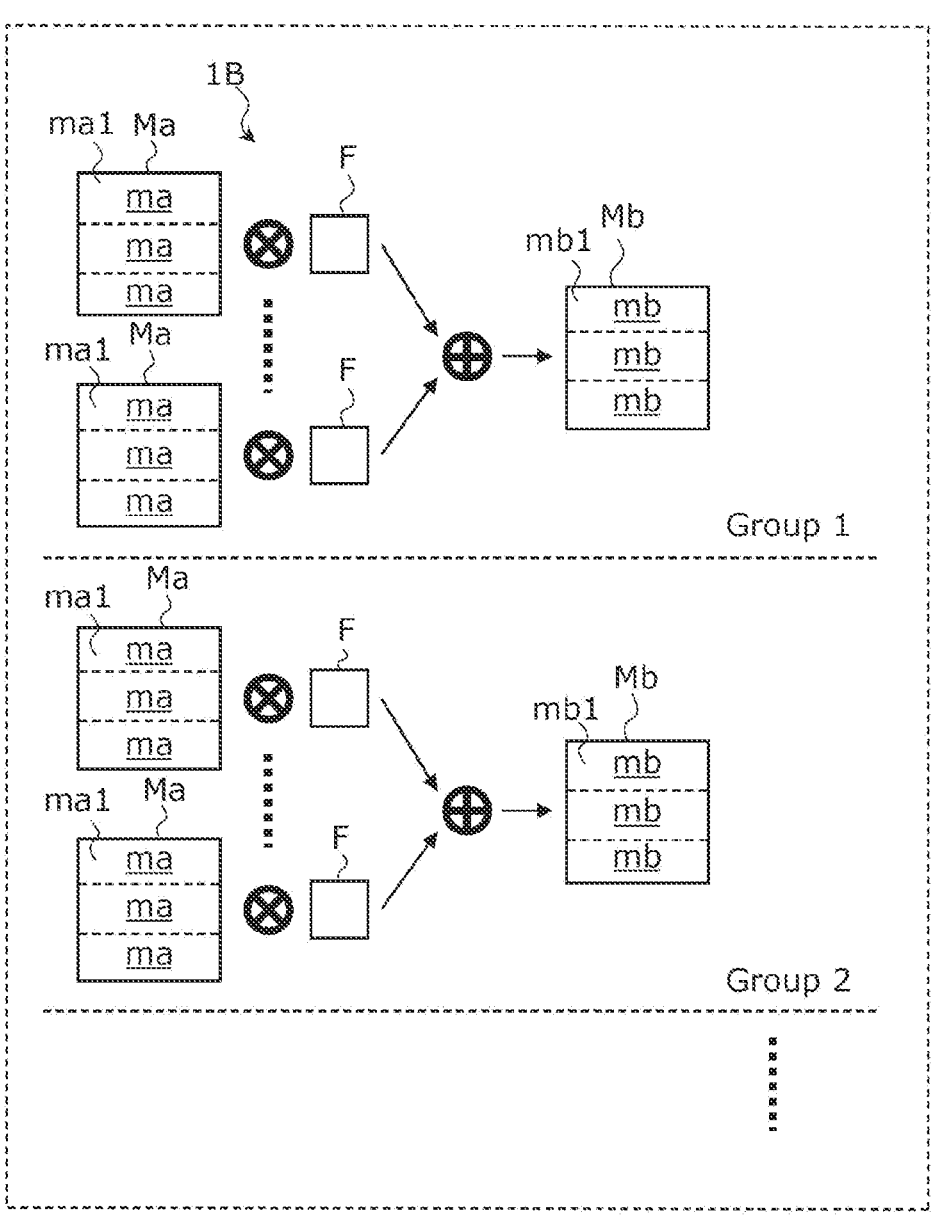
FIG. 13 is a schematic diagram illustrating arithmetic processing of an arithmetic processing system according to Embodiment 3.

FIG. 13 is a schematic diagram illustrating arithmetic processing of arithmetic processing system 1B according to Embodiment 3.

In arithmetic processing system 1B, convolution operations to be executed on a single layer are divided into a plurality of groups such as group 1 and group 2. In Embodiment 3, convolution operations are executed for each group such as group 1 or group 2 to generate output feature map Mb for each group such as group 1 or group 2.

For example, arithmetic-logic unit 10 acquires first partition map ma1 out of a plurality of partition maps ma from each of a plurality of input feature maps Ma and executes convolution operations on each of the plurality of (i.e., c) acquired first partition maps ma1 by multiplications by filter factors F to generate first partition map mb1 that have undergone the convolution operation. Arithmetic-logic unit 10 repeats the aforementioned operation and other steps a given number of times corresponding to the number of a plurality of filter factors F for group 1 so as to generates a plurality of first partition maps mb1 that have undergone the operations for group 1.

The number input feature maps Ma for each group is an integer greater than or equal to 2 and is determined to such a size (data amount) that partition maps ma and other data can be stored in internal memory 13 of arithmetic-logic unit 10.

Specifically, a total number of input feature maps Ma is determined to satisfy Expression 2 below, where D is the number of partitions, d1a is the data amount of all of a plurality of input feature maps Ma in the group, d2a is the data amount of all of a plurality of output feature maps Mb in the group after execution of convolution operations, and B1 is the capacity of internal memory 13 of arithmetic-logic unit 10.

$$D \geq (d1a + d2a)/B1 \qquad \text{[Expression 2]}$$

Arithmetic-logic unit 10 executes the aforementioned convolution operations for group 2 and subsequent groups in the same manner. When the operations for all of the groups have been completed, all output feature maps Mb are generated and the processing of a single feature extraction layer ends.

Even if a plurality of input feature maps Ma are partitioned into a plurality of groups and output feature maps are generated for each group as in arithmetic processing system 1B, it is possible to reduce a decline in the efficiency of data transfer between arithmetic-logic unit 10 and the external memory.

Embodiment 4

Arithmetic processing system 1C according to Embodiment 4 will be described with reference to FIGS. 14A to 16. Embodiment 4 describes an example in which the arithmetic-logic unit subdivides each input feature map Ma and acquires the sub-divided input feature map in the form of compressed data.

Figure 14A:
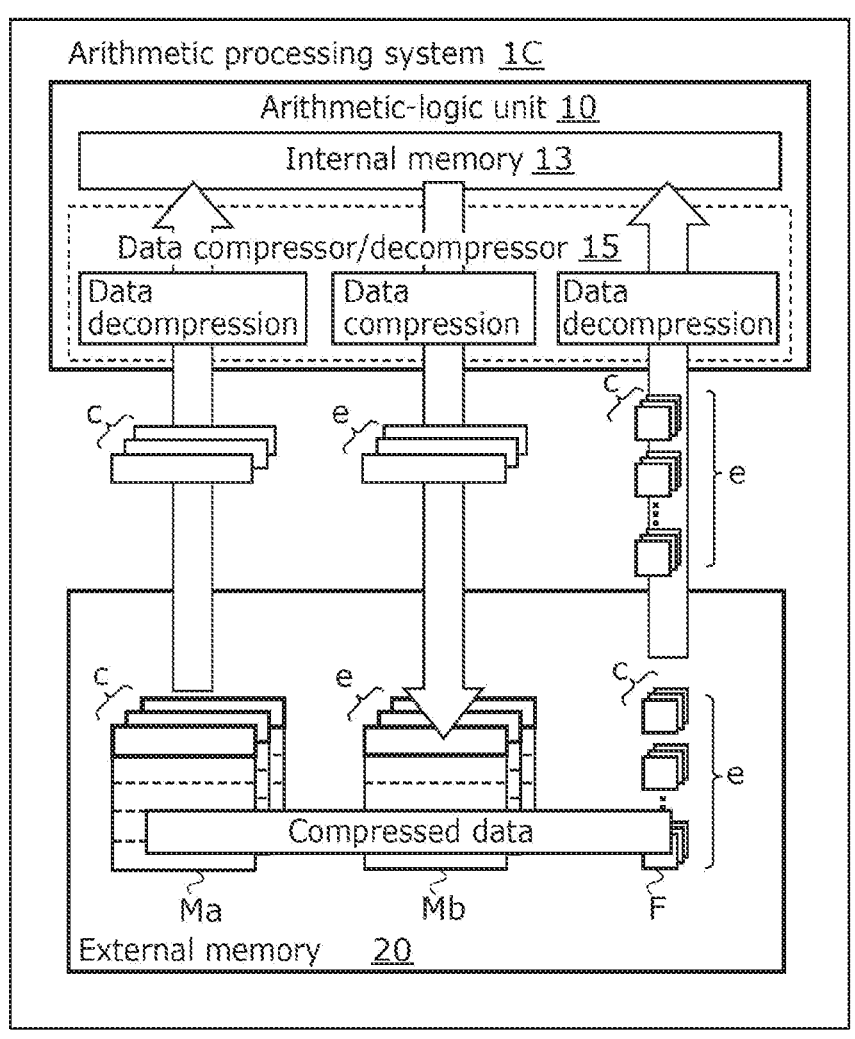
FIG. 14A is a schematic diagram illustrating an arithmetic processing system according to Embodiment 4.
Figure 14B:
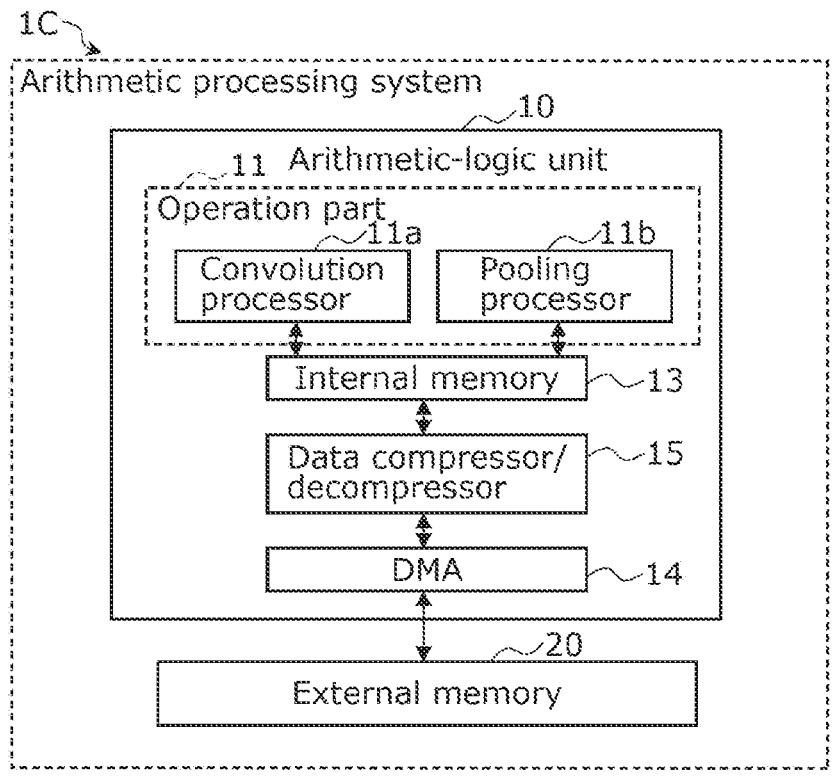
FIG. 14B is a block diagram illustrating a functional configuration of the arithmetic processing system according to Embodiment 4.

FIG. 14A is a schematic diagram illustrating arithmetic processing system 1C according to Embodiment 4. FIG. 14B is a block diagram illustrating a functional configuration of arithmetic processing system 1C.

As illustrated in FIGS. 14A and 14B, arithmetic processing system 1C includes arithmetic-logic unit 10 that executes convolution operations and external memory 20 connected to arithmetic-logic unit 10.

External memory 20 is provided outside arithmetic-logic unit 10 and inside arithmetic processing system 1C. External memory 20 stores a plurality of input feature maps Ma that have not undergone operations yet, a plurality of output feature maps Mb that have undergone operations, and a plurality of filter factors F that are used in operations. External memory 20 may, for example, be a readable and writable recording medium such as a DRAM.

Arithmetic-logic unit 10 is a device that executes convolution operations using input feature maps Ma and filter factors F. As illustrated in FIG. 14B, arithmetic-logic unit 10 includes operation part 11, internal memory 13 connected to operation part 11, direct memory access (DMA) 14 connected to internal memory 13, and data compressor/decompressor 15. In FIG. 14A, operation part 11 and DMA 14 are not shown. Arithmetic-logic unit 10 may, for example, be an accelerator that supports to enhance the speed of computer processing.

Operation part 11 includes convolution processor 11a that performs convolution processing and pooling processor 11b that performs pooling processing. Internal memory 13 has the function of temporarily storing data that is input from external memory 20 via DMA 14 and data compressor/decompressor 15, and data that is output from operation part 11. DMA 14 has the function of outputting data that is read out from external memory 20 to data compressor/decompressor 15 and outputting data that is compressed by data compressor/decompressor 15 to external memory 20. Note that operation part 11 may include at least convolution processor 11a and does not necessarily have to include pooling processor 11b, or may include other processors.

Data compressor/decompressor 15 decompresses (extracts) compressed data that is acquired from DMA 14 and outputs the decompressed data to internal memory 13, or compresses data that is temporarily stored in internal memory 13 and outputs the compressed data to DMA 14. Examples of data compression methods to be adopted include run-length compression and zero-value compression. Run-length compression is a method of data compression in which, for example when data is expressed as an array of numeric values or the like including a plurality of 0s, consecutive 0s in the data and non-zero values other than 0 are sequentially output so as to compress data. Zero-value compression is a method of data compression in which, for example when data is expressed as an array of numeric values or the like including a plurality of 0s, 1-bit mask data indicating either zero or non-zero and values other than zero are output to compress data.

Although data compressor/decompressor 15 in FIG. 14B is included in arithmetic-logic unit 10, data compressor/decompressor 15 may be provided between DMA 14 and external memory 20 and outside arithmetic-logic unit 10. In this case, data compressor/decompressor 15 decompresses (extracts) compressed data acquired from external memory 20 and outputs the decompressed data to DMA 14, or compresses data transferred from DMA 14 and outputs the compressed data to external memory 20.

Figure 15:
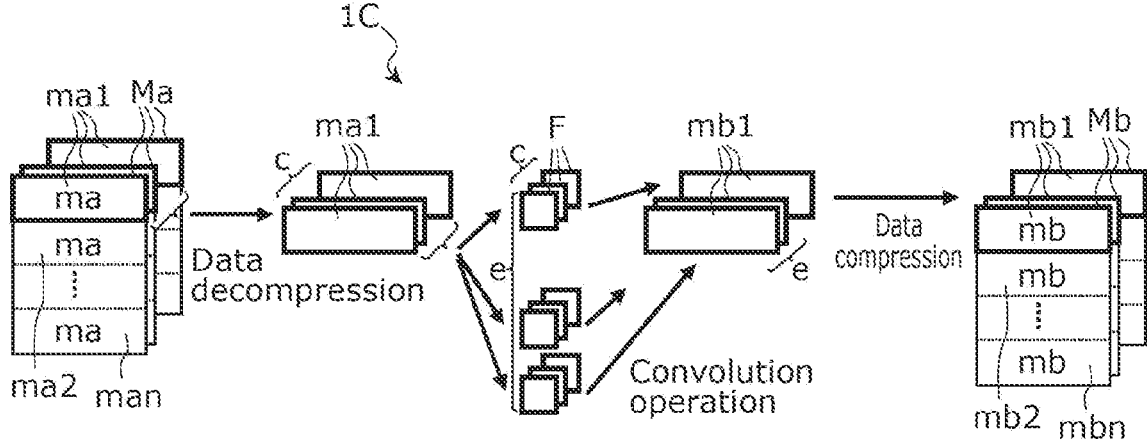
FIG. 15 is a diagram illustrating an overview of a convolution operation process of the arithmetic processing system according to Embodiment 4.

FIG. 15 is a diagram illustrating an overview of a convolution operation process of arithmetic processing system 1C according to Embodiment 4.

FIG. 15 shows c channels of input feature maps Ma, (c×e) filter factors F, and e channels of output feature maps Mb. FIG. 15 shows an example in which each input feature map Ma is configured by a plurality of subdivided partition maps ma. Each partition map ma is partial data of input feature map Ma. FIG. 15 also shows an example in which each output feature map Mb is configured by a plurality of subdivided partition maps mb. Each partition map mb is partial data of output feature map Mb.

In FIG. 15, first partition map ma1, second partition map ma2, and n-th partition map man are shown as n partition maps that configure each input feature map Ma, where n is an integer greater than or equal to 2.

For example, arithmetic-logic unit 10 acquires compressed data of first partition map ma1 out of the plurality of partition maps ma from each of input feature maps Ma, decompresses the compressed data of the plurality of acquired first partition maps ma1, and executes a convolution operation on each of the plurality of (i.e., c) decompressed first partition maps ma1 by multiplications by filter factors F so as to generate first partition map mb1 that have undergone the operations. Arithmetic-logic unit 10 repeats the aforementioned operations and other steps a given number of times corresponding to the number of filter factors F so as to generate a plurality of (i.e., e) first partition maps mb1 that have undergone the operations, a total number of which corresponds to the number of filter factors F. Arithmetic-logic unit 10 further compresses data of first partition maps mb1 that have undergone the operations so as to generate compressed data.

The number of input feature maps Ma is an integer greater than or equal to 2 and is determined to such a size (data amount) that partition maps ma and other data can be stored in internal memory 13 of arithmetic-logic unit 10.

Specifically, a total number of input feature maps Ma is determined so as to satisfy Expression 1 below, where D is the number of partitions, d1 is the data amount of all of a plurality of input feature maps Ma, d2 is the data amount of all of a plurality of output feature maps Mb obtained by execution of convolution operations, and B1 is the capacity of internal memory 13 of arithmetic-logic unit 10.

$$D \geq (d1+d2)/B1 \qquad \text{[Expression 1]}$$

Next, processing operations of arithmetic processing system 1C will be described.

Figure 16:
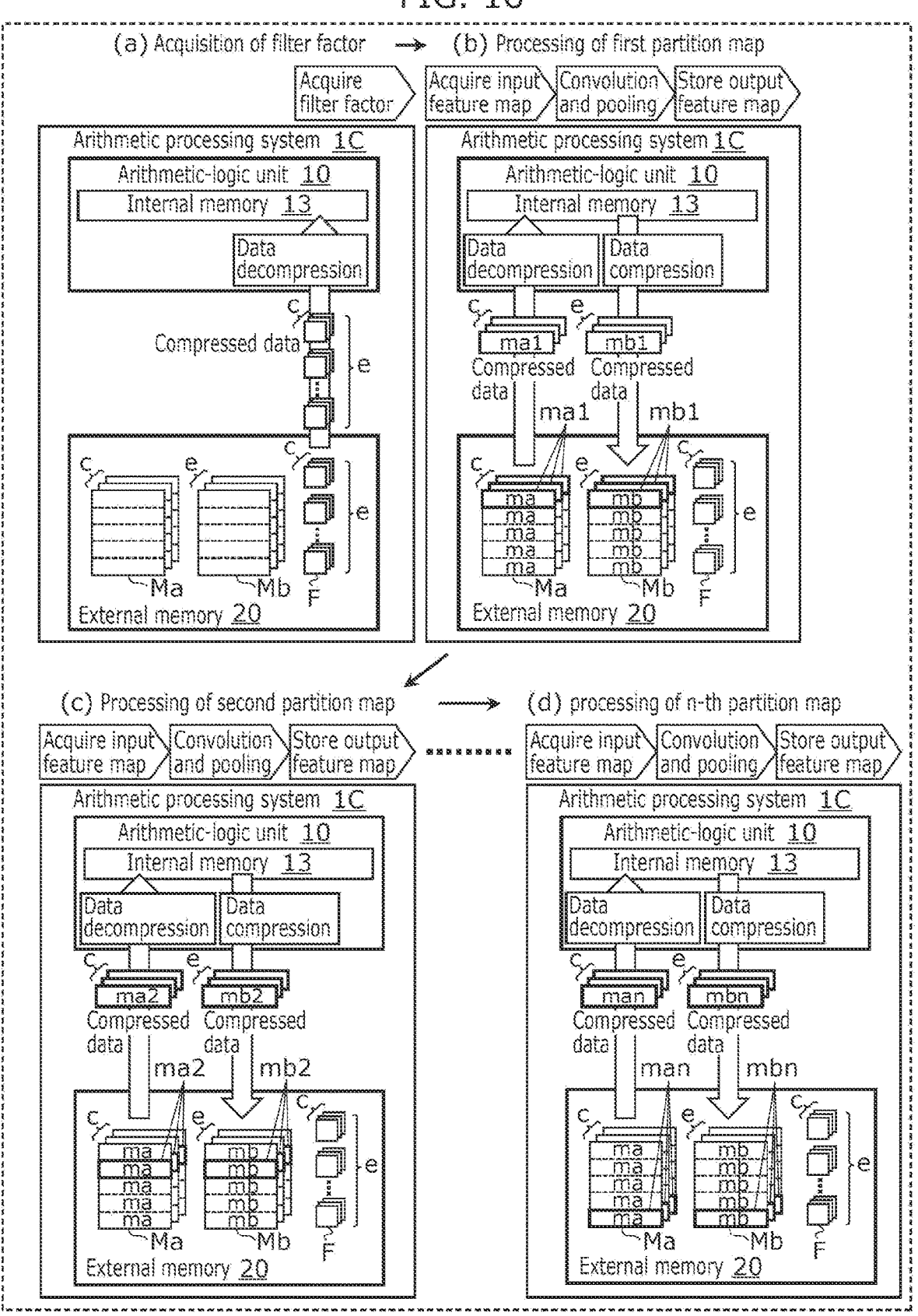
FIG. 16 is a schematic diagram illustrating processing operations of the arithmetic processing system according to Embodiment 4.

FIG. 16 is a schematic diagram illustrating the processing operations of arithmetic processing system 1C. In FIG. 16, processing from (a) to (d) is executed in this order.

As illustrated in (a) in FIG. 16, arithmetic-logic unit 10 acquires compressed data of a plurality of filter factors F from external memory 20 before execution of the convolution operations. An example in which compressed data of (c×e) filter factors F is output from external memory 20 to internal memory 13 of arithmetic-logic unit 10 is shown in (a) in FIG. 16.

As illustrated in (b) in FIG. 16, arithmetic-logic unit 10 acquires compressed data of first partition map ma1 out of partition maps ma from each input feature map Ma stored in external memory 20. The aforementioned compressed data is compressed data of the plurality of first partition maps ma1. Next, arithmetic-logic unit 10 decompresses the compressed data of first partition maps ma1 acquired from external memory 20. Then, arithmetic-logic unit 10 executes a convolution operation on each of the plurality of (i.e., c) decompressed first partition maps ma1 by multiplications by filter factors F so as to generate first partition map mb1. Arithmetic-logic unit 10 repeats the aforementioned operation and other steps a given number of times corresponding to the number of filter factors F so as to generate compressed data of the plurality of (i.e., e) first partition maps mb1 that have undergone the operations, a total number of which corresponds to the number of filter factors F, and stores the generated compressed data in external memory 20. Note that the compressed data of first partition maps mb1 stored in external memory 20 configures parts of input feature maps that are read out before execution of the convolution operations to be executed on the next layer.

As illustrated in (c) in FIG. 16, arithmetic-logic unit 10 acquires compressed data of second partition map ma2 out of partition maps ma from each input feature map Ma stored in external memory 20. Note that the aforementioned compressed data is compressed data of second partition maps ma2. Next, arithmetic-logic unit 10 decompresses the compressed data of second partition maps ma2 acquired from external memory 20. Then, arithmetic-logic unit 10 executes a convolution operation on each of the plurality of (i.e., c) decompressed second partition maps ma2 by multiplications by filter factors F so as to generate second partition map mb2. Arithmetic-logic unit 10 repeats the aforementioned operation and other steps a given number of times corresponding to the number of filter factors F so as to generate compressed data of a plurality of (i.e., e) second partition maps mb2 that have undergone the operations, a total number of which corresponds to the number of filter factors F, and stores the generated compressed data in external memory 20. Note that the compressed data of second partition maps mb2 stored in external memory 20 configures parts of the input feature maps that are read out before execution of the convolution operations to be executed on the next layer.

Arithmetic-logic unit 10 repeats the same processing as described above n times. Specifically, as illustrated in (d) in FIG. 16, arithmetic-logic unit 10 acquires compressed data of n-th partition map man out of partition maps ma from each input feature map Ma stored in external memory 20. Note that the aforementioned compressed data is compressed data of the plurality of n-th partition maps man. Next, arithmetic-logic unit 10 decompresses the compressed data of n-th partition maps man acquired from external memory 20. Then, arithmetic-logic unit 10 executes a convolution operation on each of the plurality of (i.e., c) decompressed n-th partition maps man so as to generate n-th partition map mbn. Arithmetic-logic unit 10 repeats the aforementioned operation and other steps a given number of times corresponding to the number of filter factors F to generate compressed data of the plurality of (i.e., e) n-th partition maps mbn that have undergone the operations, a total number of which corresponds to the number of filter factors F, and stores the generated compressed data in external memory 20.

Accordingly, all of output feature maps Mb, a total number of which corresponds to the number of filter factors F, are generated, and the processing of a single feature extraction layer is completed. Subsequent to the processing of the first feature extraction layer, processing of the second feature extraction layer is performed. When the processing of a predetermined number of layers has been completed, the processing of the intermediate layer in the convolution neural network ends.

Note that the convolution operations may also be performed without storing filter factors F in internal memory 13. In that case, the processing illustrated in (a) in FIG. 16 is unnecessary, and the convolution operations illustrated in (b) to (d) in FIG. 16 are performed by acquiring filter factors F not from internal memory 13 but from external memory 20. This eliminates the need to store filter factors F in internal memory 13 and makes it possible to reduce the size of internal memory 13.

Arithmetic processing system 1C described above can reduce the number of filter factors F that are to be read out from external memory 20, the amount of readout data (total value) of input feature maps Ma, and the amount of written data (total value) of output feature maps Mb that is to be written to external memory 20 and therefore can reduce a decline in the amount of data transfer as compared with the amount of data transfer in arithmetic processing system 101 according to the comparative example. This reduces a decline in the efficiency of data transfer between arithmetic-logic unit 10 and external memory 20.

Since data compression changes the size of data obtained by the compression, the boundaries of a plurality of partition maps (e.g., mb1, mb2) of each output feature map Mb to be stored in external memory 20 may become uncertain. Thus, in some cases, arithmetic-logic unit 10 may not be able to appropriately acquire partition maps (e.g., ma1) when processing the next layer. If data compression is conducted over the aforementioned boundaries in order to make allowance for errors, unnecessary data other than the partition maps that are directly necessary for the processing will also be acquired from external memory 20, and needless data transfer occurs.

In view of this, arithmetic processing system 1C according to Embodiment 4 transfers information so as to enable identification of boundary locations of partition maps mb1. For example, when outputting partition maps mb1 to external memory 20, arithmetic-logic unit 10 also outputs the addresses of boundary locations of partition maps mb1 to external memory 20. External memory 20 stores the relationship between the partition maps and the aforementioned addresses in the form of table data. When processing the next layer, arithmetic-logic unit 10 acquires partition maps ma1 that should be acquired, from external memory 20, using the aforementioned addresses stored in external memory 20.

Although arithmetic-logic unit 10 according to the present embodiment outputs and acquires the addresses of boundary locations to and from the external memory, other methods may also be employed as long as arithmetic-logic unit 10 can use the addresses of boundary locations in the processing of the next layer. For example, a method is conceivable in which arithmetic processing system 1C includes a control CPU that controls arithmetic-logic unit 10, and the control CPU acquires the addresses of boundary locations from arithmetic-logic unit 10 and sets the addresses in arithmetic-logic unit 10 before the processing of the next layer. In this case, arithmetic-logic unit 10 can appropriately acquire a plurality of partition maps ma and appropriately execute arithmetic processing.

Alternatively, instead of the addresses of boundary locations of partition maps mb1, the data size of partition maps mb1 may be output to external memory 20. In this case, in the processing of the next layer, the aforementioned data size stored in external memory 20 is used to acquire partition maps ma1 that should be acquired, from external memory 20.

Embodiment 5

Arithmetic processing system 1D according to Embodiment 5 will be described. Embodiment 5 describes an example in which partition maps that have undergone operations are not discretized in external memory 20 and stored in appropriately aggregated form.

To clarify the difference from Embodiment 5, external memory 20 of arithmetic processing system 1C according to Embodiment 4 will be described.

Figure 17:
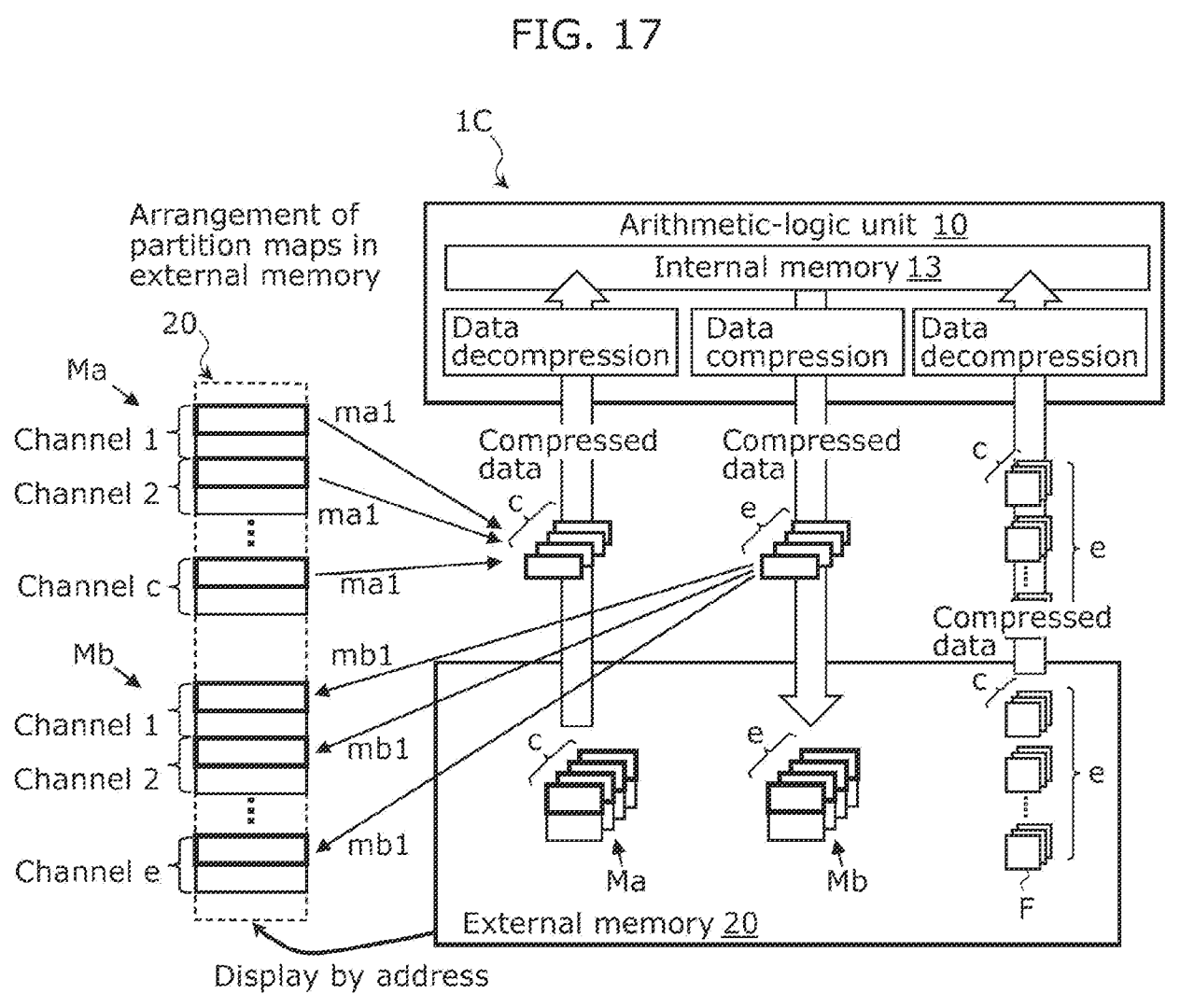

FIG. 17 is a schematic diagram illustrating partition maps stored in external memory 20 of arithmetic processing system 1C according to Embodiment 4. Input feature maps Ma and output feature maps Mb are respectively stored in aggregated form in external memory 20, and in each of input feature maps Ma and output feature maps Mb, feature maps belonging to each single channel are aggregated and stored in the order of channel number from channel 1 to channel 2 and so on.

Thus, when a convolution operation is performed on each partition map as in Embodiment 4, arithmetic-logic unit 10 reads a plurality of partition maps (e.g., ma1) from discrete locations (random locations) in external memory 20 and writes a plurality of partition maps (e.g., mb1) to discrete locations in external memory 20. In convolution neural network 5, a later layer has a smaller map size and a larger number of channels (see FIG. 1), and in external memory 20, a later layer has partition maps with small amounts of data discretized to each channel. For example, when external memory 20 is a DRAM, it is desirable that large continuous data be transferred in the memory in order to improve the efficiency of data transfer from external memory 20 to arithmetic-logic unit 10. However, in external memory 20 of Embodiment 4, a later layer has smaller data discretized to a larger number of locations and accordingly suffers a decline in the efficiency of data transfer. In view of this, in Embodiment 5, for example data of a plurality of first partition maps mb1 that have undergone operations is compressed and stored in external memory 20 so as to be located at adjacent addresses in external memory 20.

Figure 18:
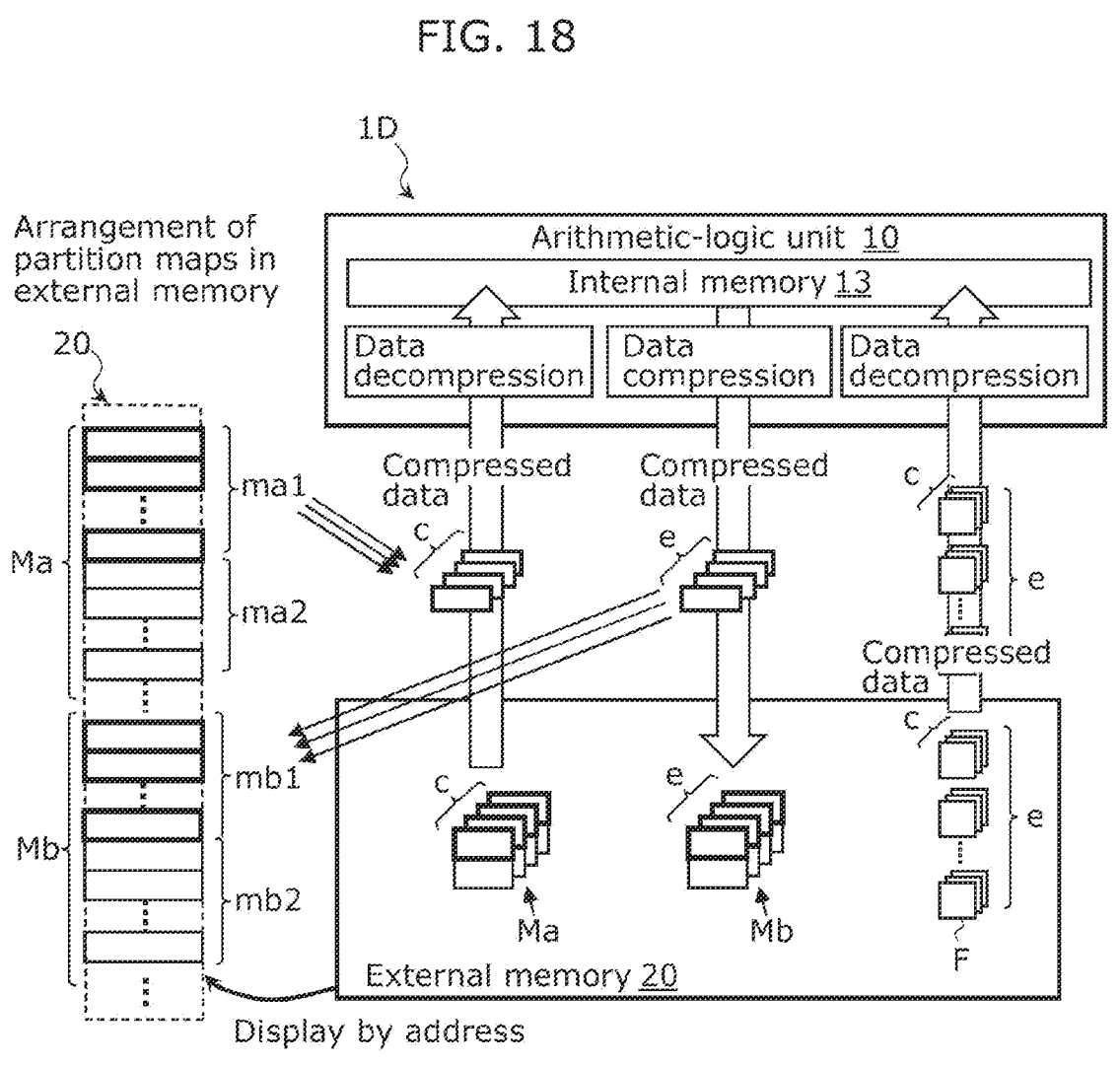

FIG. 18 is a schematic diagram illustrating the layout of partition maps in external memory 20 of arithmetic processing system 1D according to Embodiment 5. FIG. 18 shows that a plurality of first partition maps mb1 that have undergone operations are located at adjacent addresses in external memory 20. In external memory 20, not only first partition maps mb1, but also a plurality of second partition maps mb2 and a plurality of n-th partition maps mbn are also respectively allocated in aggregated and compressed form in output feature maps Mb.

Output feature maps Mb are used as input feature maps Ma in the convolution operations to be executed on the next layer. Thus, if partition maps of output feature maps Mb are allocated in aggregated and compressed form in external memory 20, partition maps of input feature maps Ma that are used in execution of the convolution operations to be executed on the next layer are also allocated in aggregated and compressed form in external memory 20. Specifically, a plurality of first partition maps ma1, a plurality of second partition maps ma2, and a plurality of n-th partition maps man are respectively allocated in aggregated and compressed form in a plurality of input feature maps Ma.

In this way, the partition maps (e.g., ma1) of the input feature maps and the partition maps (e.g., mb1) of the output feature maps are respectively allocated in aggregated and compressed form in external memory 20. This makes data to be transmitted and received between arithmetic-logic unit 10 and external memory 20 into continuous less-discrete data. Accordingly, it is possible to reduce a decline in the efficiency of data transfer between arithmetic-logic unit 10 and external memory 20.

Since data compression changes the size of data obtained by the compression, the boundaries of a plurality of partition maps (e.g., mb1, mb2) of each output feature map Mb to be stored in external memory 20 may become uncertain. In view of this, arithmetic processing system 1D according to Embodiment 5 transfers information so as to enable identification of boundary locations of partition maps mb1 as in Embodiment 4. For example, when outputting partition maps mb1 to external memory 20, arithmetic-logic unit 10 also outputs the addresses of boundary locations of partition maps mb1 to external memory 20. External memory 20 stores the relationship between the partition maps and the aforementioned addresses in the form of table data. When processing the next layer, arithmetic-logic unit 10 acquires partition maps ma1 that should be acquired, from external memory 20, using the aforementioned addresses stored in external memory 20.

Although arithmetic-logic unit 10 according to the present embodiment outputs and acquires the addresses of boundary locations to and from the external memory, other methods may also be employed as long as arithmetic-logic unit 10 can use the addresses of boundary locations in the processing of the next layer. For example, a method is conceivable in which arithmetic processing system 1D includes a control CPU that controls arithmetic-logic unit 10, and the control CPU acquires the addresses of boundary locations from arithmetic-logic unit 10 and sets the addresses in arithmetic-logic unit 10 before the processing of the next layer. In this case, arithmetic-logic unit 10 can appropriately acquire a plurality of partition maps ma and appropriately execute arithmetic processing.

Alternatively, instead of the addresses of boundary locations of partition maps mb1, the data size of partition maps mb1 may be output to external memory 20. In this case, in the processing of the next layer, the aforementioned data size stored in external memory 20 is used to acquire partition maps ma1 that should be acquired, from external memory 20.

[Variation 1 of Embodiment 5]

Arithmetic processing system 1D according to Variation 1 of Embodiment 5 will be described with reference to FIGS. 19 and 20. Variation 1 describes an example in which the size of partition maps mb to be stored in external memory 20 is determined in accordance with partition maps that are used in the convolution operations executed on the currently processing layer or the convolution operations to be executed on the next layer.

Figure 19:
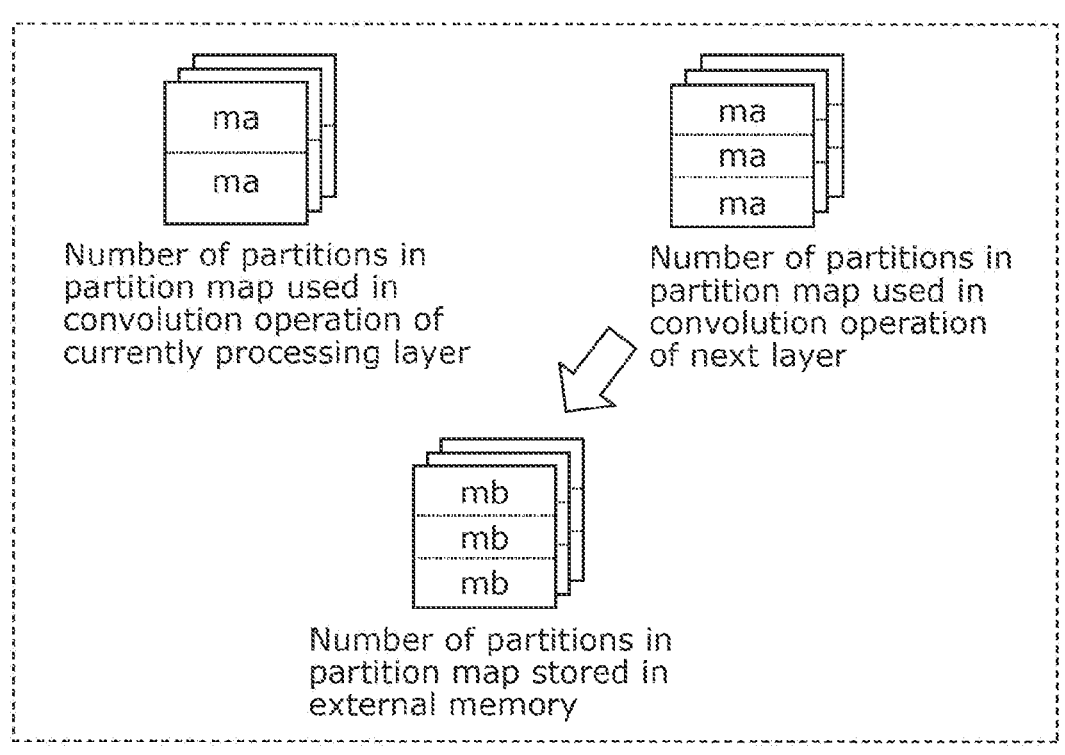
FIG. 19 is a schematic diagram illustrating partition maps used in arithmetic processing of an arithmetic processing system according to Variation 1 of Embodiment 5.
Figure 20:
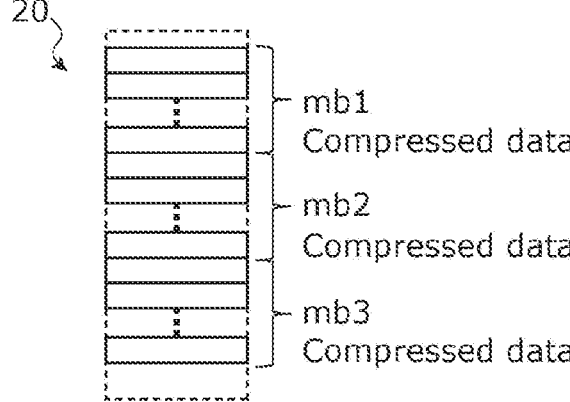
FIG. 20 is a schematic diagram illustrating partition maps stored in an external memory according to Variation 1 of Embodiment 5.

FIG. 19 is a schematic diagram illustrating partition maps ma and mb used in arithmetic processing of arithmetic processing system 1D according to Variation 1. FIG. 20 is a schematic diagram illustrating partition maps mb1 to mb3 stored in external memory 20 according to Variation 1.

FIG. 19 shows an example in which the number of partition maps ma that are used in the convolution operations executed on the currently processing layer is two, and the number of partition maps ma that are used in the convolution operations to be executed on the next layer is three. In this case, arithmetic-logic unit 10 compares the number of partition maps ma used in the convolution operations to be executed on the next layer and the number of partition maps ma that are used in the convolution operations executed on the currently processing layer and select a larger number of partitions. In the example illustrated in FIG. 19, each output feature map Mb is partitioned into three in accordance with the selected number of partitions (i.e., three), and arithmetic-logic unit 10 stores each of resultant partition maps mb1 to mb3 in aggregated form in external memory 20. Note that arithmetic-logic unit 10 performs convolution operations on partition maps ma1 and ma2 obtained by partitioning each input feature map Ma into two, and stores this result in the external memory such that partition maps mb1 to mb3 are respectively stored in aggregated form in external memory 20. As a result, as illustrated in FIG. 20, a plurality of partition maps mb1, a plurality of partition maps mb2, and a plurality of partition maps mb3 are respectively stored in aggregated and compressed form in external memory 20.

In this way, arithmetic-logic unit 10 according to Variation 1 stores a plurality of partition maps mb in external memory 20 such that partition maps mb are respectively aggregated in accordance with the maximum number of partitions out of a plurality of partition maps ma used in the convolution operations executed on the currently processing layer and the convolution operations to be executed on the next layer. Accordingly, arithmetic-logic unit 10 is capable of acquiring a plurality of partition maps ma in aggregated form from external memory 20 when performing the convolution operations to be executed on the next layer. This improves the efficiency of data transfer between arithmetic-logic unit 10 and external memory 20.

Note that the number of partition maps mb is not limited to the maximum number of partitions, and arithmetic-logic unit 10 may store, in external memory 20, partition maps mb that are each partitioned in accordance with a total number of partition maps ma that are used in the convolution operations to be executed on the next layer, i.e., a total number of input feature maps Ma that are used in the convolution operations to be executed on the next layer.

Moreover, arithmetic-logic unit 10 may partition each partition map ma that is used in the convolution operations executed on the currently processing layer in accordance with the number of partition maps ma that are used in the convolution operations to be executed on the next layer. The example illustrated in FIG. 19 corresponds to the case in which the number of partition maps ma for the currently processing layer is three. Accordingly, a total number of partition maps ma that are used in convolution operations becomes equal to a total number of partition maps mb that are aggregated in the external memory, and as a result, a total number of partitions used in convolution operations becomes equal to a total number of partitions used in aggregation in the external memory. This facilitates control of the arithmetic processing of arithmetic-logic unit 10.

When storing a plurality of partition maps mb1 to mb3 in external memory 20, arithmetic-logic unit 10 may output information that indicates boundary locations of partition maps mb1 to mb3 to external memory 20. External memory 20 may store the relationship between partition maps mb1 to mb3 and the aforementioned information indicating boundary locations in the form of table data.

[Variation 2 of Embodiment 5]

Arithmetic processing system 1D according to Variation 2 of Embodiment 5 will be described with reference to FIGS. 21 and 22. Variation 2 describes an example in which partition maps mb to be stored in external memory 20 are generated using both partition boundaries that are used in the convolution operations executed on the currently processing layer and the convolution operations to be executed on the next layer.

Figure 21:
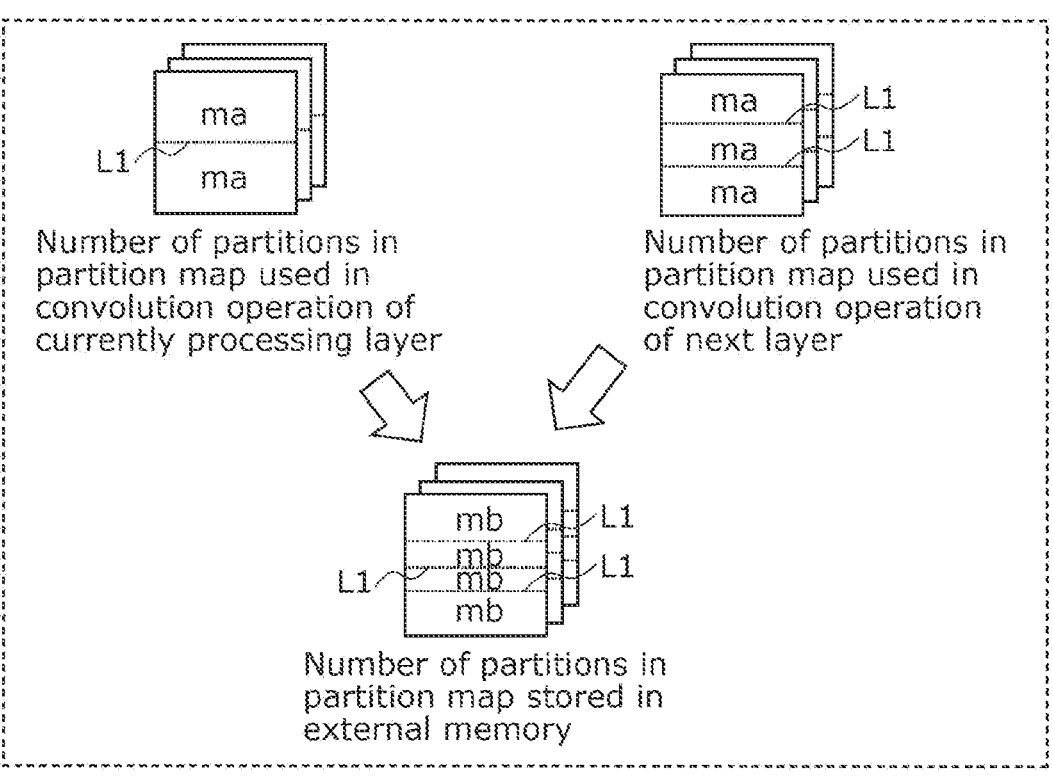
FIG. 21 is a schematic diagram illustrating partition maps used in arithmetic processing of an arithmetic processing system according to Variation 2 of Embodiment 5.
Figure 22:
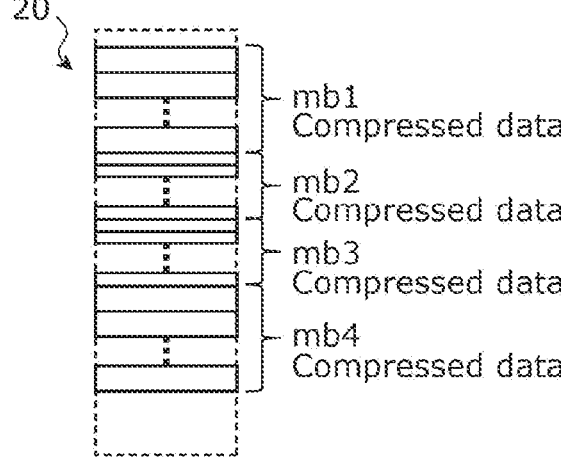
FIG. 22 is a schematic diagram illustrating partition maps stored in the external memory according to Variation 2 of Embodiment 5.

FIG. 21 is a schematic diagram illustrating partition maps ma and mb that are subjected to arithmetic processing performed by arithmetic processing system 1D according to Variation 2. FIG. 22 is a schematic diagram illustrating partition maps mb1 to mb4 stored in external memory 20 according to Variation 2.

FIG. 21 shows an example in which the number of partition maps ma that are used in the convolution operations executed on the currently processing layer is two, and an example in which the number of partition maps ma that are used in the convolution operations to be executed on the next layer is three. Boundaries L1 of the partition maps ma are different between these two examples. According to Variation 2, a plurality of partition maps mb, namely partition maps mb1 to mb4, each include both boundaries L1 of partition maps ma that are used in the convolution operations executed on the currently processing layer and boundaries L1 of pattern maps ma that are used in the convolution operations to be executed on the next layer, and are respectively compressed in aggregated form and stored in external memory 20. As a result, as illustrated in FIG. 22, each of a plurality of partition maps mb1, a plurality of partition maps mb2, a plurality of partition maps mb3, and a plurality of partition maps mb4 are respectively stored in aggregated and compressed form in external memory 20. External memory 20 stores the relationship between partition maps mb1 to mb4 and the aforementioned addresses in the form of table data. In this way, arithmetic-logic unit 10 according to Variation 2 compresses data and stores, in external memory 20, a plurality of partition maps mb (mb1 to mb4) each including both of boundaries L1 of a plurality of partition maps that are used in the convolution operations executed on the currently processing layer and boundaries L1 of a plurality of partition maps that are used in the convolution operations to be executed on the next layer. This allows arithmetic-logic unit 10 to acquire a plurality of partition maps ma stored in aggregated form from external memory 20 when performing the convolution operations on the next layer. This improves the efficiency of data transfer between arithmetic-logic unit 10 and external memory 20.

Note that arithmetic-logic unit 10 may divide each partition map ma that is used in the convolution operations executed on the currently processing layer in accordance with the number of partition maps ma that are used in the convolution operations to be executed on the next layer. The example illustrated in FIG. 22 corresponds to a case in which the number of partition maps ma that are used in the convolution operations executed on the currently processing layer is four.

Alternatively, arithmetic-logic unit 10 may partition each partition map ma in partition form that includes both boundaries L1 (in the example illustrated in 21, into four partitions). Accordingly, a total number of partition maps ma used in convolution operations becomes equal to a total number of partition maps mb aggregated in the external memory, and as a result, a total number of partitions in the case of performing convolution operations becomes equal to a total number of partitions in the case of aggregating data in the external memory. This facilitates control of the arithmetic processing of arithmetic-logic unit 10.

Embodiment 6

Arithmetic processing system 1E according to Embodiment 6 will be described. Although the example in which single output feature map Mb is generated from all input feature maps Ma has been described in Embodiment 4, Embodiment 6 describes an example in which a plurality of input feature maps Ma is divided into a plurality of groups and one output feature map is generated for each group.

Figure 23:
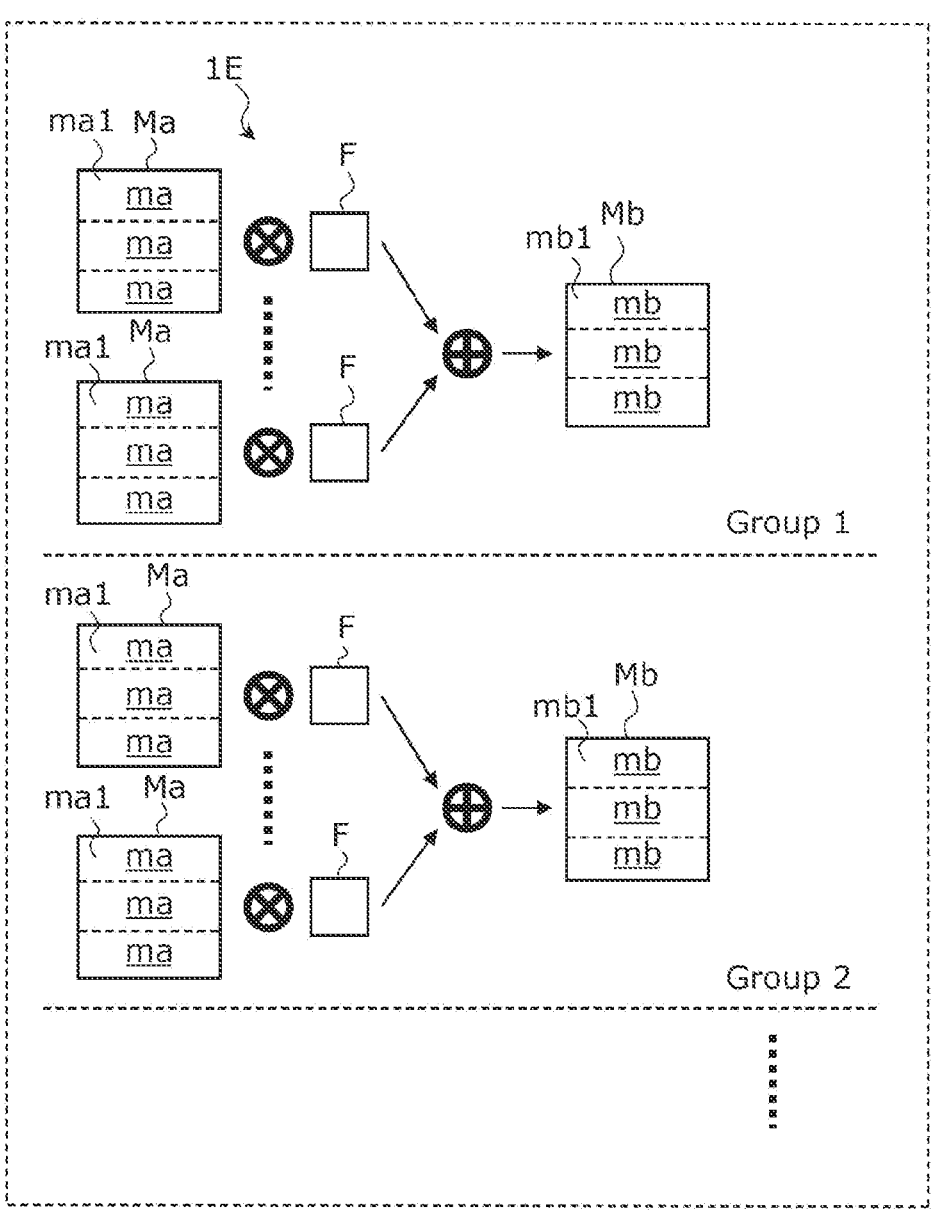
FIG. 23 is a schematic diagram illustrating arithmetic processing of an arithmetic processing system according to Embodiment 6.

FIG. 23 is a schematic diagram illustrating arithmetic processing of arithmetic processing system 1E according to Embodiment 6.

In arithmetic processing system 1E, convolution operations performed for a single layer are divided into a plurality of groups such as group 1, group 2, and so on. In Embodiment 6, convolution operations are executed for each of groups 1, 2, and so on, and output feature map Mb is generated for each of groups 1, 2, and so on.

For example, arithmetic-logic unit 10 acquires compressed data of first partition map ma1 out of a plurality of partition maps ma from each of a plurality of input feature maps Ma, decompresses the compressed data of the plurality of acquired first partition maps ma1, and executes convolution operations on each of the plurality of (i.e., c) decompressed first partition maps ma1 by multiplications by filter factors F so as to compress and generate first partition map mb1 that have undergone the operations. Arithmetic-logic unit 10 repeats the aforementioned operations and other steps a given number of times corresponding to the number of filter factors F for group 1, and generates compressed data of a plurality of first partition maps mb1 that have undergone the operations for group 1.

The number of input feature map Ma for each group is an integer greater than or equal to two and is determined to such a size (data amount) that partition maps ma and other data can be stored in internal memory 13 of arithmetic-logic unit 10.

Specifically, a total number of input feature map Ma is determined so as to satisfy Expression 2 below, where D is the number of partitions, d1a is the data amount of all of a plurality of input feature maps Ma in the group, d2a is the data amount of all of a plurality of output feature maps Mb in the group after execution of the convolution operations, and B1 is the capacity of internal memory 13 of arithmetic-logic unit 10.

$$D \geq (d1a + d2a)/B1 \qquad \text{[Expression 2]}$$

Arithmetic-logic unit 10 executes the aforementioned convolution operations for group 2 and subsequent groups in the same manner as described above. When the operations for all groups have been completed, all output feature maps Mb are generated and the processing of a single feature extraction layer ends.

Even if a plurality of input feature maps Ma are divided into a plurality of groups and one output feature map is generated for each group as in arithmetic processing system 1E, it is possible to reduce a decline in the efficiency of data transfer between arithmetic-logic unit 10 and the external memory.

OTHER EMBODIMENTS

Embodiments 1 to 6 and variations thereof have been described thus far. However, the embodiments and variations described above are essentially preferable examples and do not intend to limit the scope of the present invention, the fields of applications, or the applications of the present invention.

For example, although the examples in which arithmetic-logic unit 10 acquires all filter factors F from external memory 20 before execution of the convolution operations have been described in the above embodiments, the present disclosure is not limited to these examples. Arithmetic-logic unit 10 may read only some of all filter factors F that are necessary to execute convolution operations on partition maps on an as-needed basis. For example, when executing a convolution operation on a first partition map, arithmetic-logic unit 10 may read out filter factors F necessary for the convolution operation of the first partition map from external memory 20 before the operations, and when executing a convolution operation on a second partition map, arithmetic-logic unit 10 may read out filter factors F that are necessary for the convolution operation of the second partition map from external memory 20.

For example, although the example in which a plurality of first partition maps and other data are stored in aggregated form in external memory 20 has been described above in Embodiment 2, a plurality of first partition maps do not necessarily have to be stored in aggregated form during processing of all layers that are subjected to convolution operations. For example, in the convolution neural network, a plurality of first partition maps for a former layer with a small number of channels (e.g., the first layer) may be stored in non-aggregated form, and a plurality of first partition maps for a later layer with a large number of channels (e.g., n-th layer) may be stored in aggregate form.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2020-063205 filed on Mar. 31, 2020, Japanese Patent Application No. 2020-063206 filed on Mar. 31, 2020, and Japanese Patent Application No. 2020-168368 filed on Oct. 5, 2020, and PCT International Application No. PCT/JP2021/000902 filed on Jan. 13, 2021.

INDUSTRIAL APPLICABILITY

The present disclosure is usable as an arithmetic processing system for executing a convolution neural network in fields such as image processing technology.

The invention claimed is:

1. An arithmetic processing system that executes a convolution operation, the arithmetic processing system comprising:
an external memory that stores a plurality of input feature maps that have not yet undergone the convolution operation and a plurality of filter factors that are used in the convolution operation; and
a processor that executes the convolution operation using the plurality of input feature maps and the plurality of filter factors,
wherein the processor performs at least operations of:
1) acquiring a plurality of first partition maps by acquiring a first partition map from each of the plurality of input feature maps stored in the external memory, each first partition map being one of a plurality of partition maps included in one of the plurality of input feature maps; executing the convolution operation on the plurality of first partition maps acquired from the external memory; and storing, in the external memory, the plurality of first partition maps that have undergone the convolution operation; and
2) acquiring a plurality of second partition maps by acquiring a second partition map from each of the plurality of input feature maps stored in the external memory, each second partition map being one of the plurality of partition maps included in one of the plurality of input feature maps; executing the convolution operation on the plurality of second partition maps acquired from the external memory; and

30 storing, in the external memory, the plurality of second partition maps that have undergone the convolution operation,
wherein the plurality of first partition maps, upon which the convolution operation is executed, are non-overlapping, and
the plurality of second partition maps, upon which the convolution operation is executed, are non-overlapping.

2. The arithmetic processing system according to claim 1, wherein the processor acquires all of the plurality of filter factors from the external memory before executing the convolution operation.

3. The arithmetic processing system according to claim 2, wherein the processor executes the convolution operation on each of the plurality of first partition maps and each of the plurality of second partition maps, using the plurality of filter factors.

4. The arithmetic processing system according to claim 1, wherein the processor stores the plurality of first partition maps that have undergone the convolution operation, at adjacent addresses in the external memory.

5. The arithmetic processing system according to claim 4, wherein the processor stores the plurality of partition maps in the external memory, with a total number of the plurality of partition maps corresponding to a maximum number of the plurality of partition maps that are used in the convolution operation and a next convolution operation to be executed on a next layer.

6. The arithmetic processing system according to claim 4, wherein the processor stores the plurality of partition maps in the external memory, with a total number of the plurality of partition maps corresponding to a number of the plurality of input feature maps that are used in a next convolution operation to be executed on a next layer.

7. The arithmetic processing system according to claim 4, wherein the processor stores a second plurality of partition maps in the external memory, with the second plurality of partition maps including both of boundaries of the plurality of partition maps that are used in the convolution operation and boundaries of a next plurality of partition maps that are used in a next convolution operation to be executed on a next layer.

8. The arithmetic processing system according to claim 1, wherein a number of the plurality of input feature maps is an integer greater than or equal to 2, and $$D \geq (d1+d2)/B1 \text{ is satisfied,}$$

where D is a number of partitions;
d1 is a data amount of the plurality of input feature maps;
d2 is a data amount of a plurality of output feature maps after execution of the convolution operation; and
B1 is a capacity of an internal memory of the processor.

9. A convolution operation method of executing a convolution operation on input data, the convolution operation method comprising:
acquiring first partial data from each input data stored in an external memory, each first partial data being a first part of data included in one of the input data;
executing the convolution operation on each first partial data acquired from the external memory;
storing, in the external memory, each first partial data that has undergone the convolution operation;

acquiring second partial data from each input data stored in the external memory, each second partial data being a second part of the data included in one of the input data;

executing the convolution operation on each second partial data acquired from the external memory; and storing, in the external memory, each second partial data that has undergone the convolution operation, wherein the first partial data, upon which the convolution operation is executed, are non-overlapping, and the second partial data, upon which the convolution operation is executed, are non-overlapping.

10. An arithmetic processing system that executes a convolution operation, the arithmetic processing system comprising:

an external memory that stores a plurality of input feature maps that have undergone the convolution operation and a plurality of filter factors that are used in the convolution operation; and a processor that executes the convolution operation using the plurality of input feature maps and the plurality of filter factors, wherein the processor performs at least operations of:

1) acquiring compressed data of a plurality of first partition maps by acquiring compressed data of a first partition map from each of the plurality of input feature maps stored in the external memory, each first partition map being one of a plurality of partition maps included in one of the plurality of input feature maps;

2) decompressing compressed data of the plurality of first partition maps acquired from the external memory;

3) executing the convolution operation on the plurality of first partition maps; and 4) compressing and storing data of the plurality of first partition maps that have undergone the convolution operation, in the external memory, and the plurality of first partition maps, upon which the convolution operation is executed, are non-overlapping.

11. The arithmetic processing system according to claim 10, wherein the processor further performs operations of:

5) acquiring compressed data of a plurality of second partition maps by acquiring compressed data of a second partition map from each of the plurality of input feature maps stored in the external memory, each second partition map being one of the plurality of partition maps included in one of the plurality of input feature maps;

6) decompressing compressed data of the plurality of second partition maps acquired from the external memory;

7) executing the convolution operation on the plurality of second partition maps; and 8) compressing and storing data of the plurality of second partition maps that have undergone the convolution operation, in the external memory, and the plurality of second partition maps, upon which the convolution operation is executed, are non-overlapping.

12. The arithmetic processing system according to claim 10, wherein the processor acquires compressed data of the plurality of filter factors from the external memory before acquisition of the compressed data of the plurality of first partition maps.

13. The arithmetic processing system according to claim 10, wherein the processor stores the compressed data of the plurality of first partition maps that have undergone the convolution operation, at adjacent addresses in the external memory.

14. The arithmetic processing system according to claim 13, wherein the processor stores compressed data of the plurality of partition maps in the external memory, with a total number of the plurality of partition maps corresponding to a maximum number of the plurality of partition maps that are used in the convolution operation and a next convolution operation to be executed on a next layer.

15. The arithmetic processing system according to claim 13, wherein the processor stores compressed data of the plurality of partition maps in the external memory, with a total number of the plurality of partition maps corresponding to a number of the plurality of input feature maps that are used in a next convolution operation to be executed on a next layer.

16. The arithmetic processing system according to claim 13, wherein the processor stores compressed data of a second plurality of partition maps in the external memory, with the second plurality of partition maps including both of boundaries of the plurality of partition maps that are used in the convolution operation and boundaries of a next plurality of partition maps that are used in a next convolution operation to be executed on a next layer.

* * * * *